(12) United States Patent
Tang et al.

(10) Patent No.: US 12,058,656 B2
(45) Date of Patent: Aug. 6, 2024

(54) BASE STATION DEVICE, METHOD OF CONTROLLING BASE STATION DEVICE, TERMINAL DEVICE, AND METHOD OF CONTROLLING TERMINAL DEVICE

(71) Applicant: Sony Group Corporation, Tokyo (JP)

(72) Inventors: Yifu Tang, Tokyo (JP); Hiromasa Uchiyama, Tokyo (JP); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 374 days.

(21) Appl. No.: 17/604,776

(22) PCT Filed: Apr. 17, 2020

(86) PCT No.: PCT/JP2020/016855
§ 371 (c)(1),
(2) Date: Oct. 19, 2021

(87) PCT Pub. No.: WO2020/218183
PCT Pub. Date: Oct. 29, 2020

(65) Prior Publication Data
US 2022/0046640 A1 Feb. 10, 2022

(30) Foreign Application Priority Data
Apr. 26, 2019 (JP) ................. 2019-086841

(51) Int. Cl.
*H04W 72/04* (2023.01)
*H04W 4/40* (2018.01)
*H04W 72/0446* (2023.01)

(52) U.S. Cl.
CPC ......... *H04W 72/0446* (2013.01); *H04W 4/40* (2018.02)

(58) Field of Classification Search
CPC ....... H04W 72/04; H04W 4/40; H04W 74/08; H04W 24/10; H04W 92/18; H04W 72/02;
(Continued)

(56) References Cited

U.S. PATENT DOCUMENTS 10,624,113 B2 * 4/2020 Seo ................. H04L 5/0053
11,375,501 B2 * 6/2022 Gulati ............. H04W 76/14
(Continued)

FOREIGN PATENT DOCUMENTS

JP 2017-208796 A 11/2017

OTHER PUBLICATIONS

Fujitsu, Discussion on Basic Resource Allocation Methods for NR-V2X Sidelink Communication, 3GPP Draft; RI-1901946, 3rd Generation Partnership Project (3GPP), Mobile Competence Centre; 650, Route Des Lucioles; F-0692 f vol. RAN WG1, No. Athens, Greece; Feb. 25, 2019-Mar. 1, 2019 Feb. 15, 2019 (Feb. 15, 2019), pp. 1-14, XP051599640.
(Continued)

*Primary Examiner* — Man U Phan
(74) *Attorney, Agent, or Firm* — XSENSUS LLP

(57) ABSTRACT

Base station devices 20 and 30 includes communication units 21 and 31 and control units 24 and 34. The communication units 21 and 31 communicate with the terminal devices 40 and 50. When at least one symbol included in a slot format configured in the terminal devices 40 and 50 is a symbol for communication other than sidelink communication, the control units 24 and 34 transmit, to the terminal devices 40 and 50, information for use by the terminal devices 40 and 50 as a symbol for sidelink communication with at least one symbol.

15 Claims, 23 Drawing Sheets

(58) Field of Classification Search
CPC ..... H04W 72/14; H04W 72/30; H04W 72/53; H04W 84/04; H04W 72/00; H04W 72/12; H04W 74/04; H04L 1/18; H04L 5/00; H04L 1/08; H04B 17/31
USPC .......................................................... 370/329
See application file for complete search history.

(56) References Cited

U.S. PATENT DOCUMENTS

| | | | | |
|---|---|---|---|---|
| 11,601,936 | B2* | 3/2023 | Yang | H04L 5/0044 |
| 11,844,067 | B2* | 12/2023 | Ibrahim | H04W 72/0446 |
| 11,849,435 | B2* | 12/2023 | Lee | H04W 74/0808 |
| 2019/0059084 | A1* | 2/2019 | Lee | H04L 5/0007 |
| 2020/0077391 | A1* | 3/2020 | Choi | H04W 92/18 |
| 2020/0305152 | A1* | 9/2020 | Yasukawa | H04W 92/18 |
| 2021/0204307 | A1* | 7/2021 | Lee | H04W 76/14 |
| 2021/0297226 | A1* | 9/2021 | Abotabl | H04L 5/1461 |
| 2022/0030647 | A1* | 1/2022 | Lee | H04W 72/20 |
| 2022/0400485 | A1* | 12/2022 | Gulati | H04W 72/0446 |

OTHER PUBLICATIONS

International Search Report and Written Opinion mailed on Jun. 30, 2020, received for PCT Application PCT/JP2020/016855, Filed on Apr. 17, 2020, 9 pages including English Translation.

Fraunhofer HHI et al., "NR V2X Uu-based Resource Allocation", 3GPP TSG RAN WG1 #96, R1-1901845, Feb. 25-Mar. 1, 2019, 10 pages.

Huawei et al., "Frame and Slot Structure for Sidelink", 3GPP TSG RAN WG1 #96bis, R1-1904687, Apr. 8-12, 2019, 6 pages.

LG Electronics, "Discussion on Resource Allocation for NR Sidelink Model 1", 3GPP TSG RAN WG1 #96bis, R1-1905438, Apr. 8-12, 2019, 6 pages.

LG Electronics, "Uu-based Sidelink Resource Allocation/Configuration for NR V2X", 3GPP TSG RAN WG1 Ad-Hoc Meeting 1901, R1-1900652, Jan. 21-25, 2019, 5 pages.

NEC, "Considerations on Frame Structure Design for NR-U Operation", 3GPP TSG RAN WG1 #95, R1-1812418, Nov. 12-16, 2018, 5 pages.

* cited by examiner

FIG.11

| SUBCARRIER SPACING SETTING μ | SUBCARRIER SPACING [kHz] | CYCLIC PREFIX | NUMBER OF SYMBOLS PER SLOT | NUMBER OF SLOTS PER RADIO FRAME | NUMBER OF SLOTS PER SUBFRAME |
|---|---|---|---|---|---|
| 0 | 15 | NORMAL CP | 14 | 10 | 1 |
| 1 | 30 | NORMAL CP | 14 | 20 | 2 |
| 2 | 60 | NORMAL CP | 14 | 40 | 4 |
| 2 | 60 | EXTENDED CP | 12 | 40 | 4 |
| 3 | 120 | NORMAL CP | 14 | 80 | 8 |
| 4 | 240 | NORMAL CP | 14 | 160 | 16 |

1slot

1slot
(U): SIDELINK COMMUNICABLE U SYMBOL

1slot
(F): SIDELINK COMMUNICABLE F SYMBOL

FIG. 27

*TDD-UL-DL-Config*

The IE *TDD-UL-DL-Config* determines the Uplink/Downlink TDD configuration. There are both, UE- and cell specific IEs.

TDD-UL-DL-Config information element

```
-- ASN1START
-- TAG-TDD-UL-DL-CONFIG-START

TDD-UL-DL-ConfigCommon ::=    SEQUENCE {
    referenceSubcarrierSpacing        SubcarrierSpacing,
    pattern1                          TDD-UL-DL-Pattern,
    pattern2                          TDD-UL-DL-Pattern      OPTIONAL, -- Need R
    pattern3                          TDD-SL-Pattern
    ...
}

TDD-SL-Pattern ::=    SEQUENCE {
    patternType           CHOICE {
        symbols               SEQUENCE {
            nrofSidelinkSymbols   INTEGER (0..maxNrofSymbols-1),
            bitmaps               SEQUENCE {
                symbolBitmapsForSlotFormat    CHOICE {
                    oneSlot                       BIT STRING (SIZE (14)),
                    twoSlots                      BIT STRING (SIZE (28))
                }
            }
        }
    }
}

TDD-UL-DL-ConfigDedicated ::=    SEQUENCE {
    slotSpecificConfigurationsToAddModList    SEQUENCE (SIZE (1..maxNrofSlots)) OF TDD-UL-DL-SlotConfig    OPTIONAL, -- Need N
    slotSpecificConfigurationsToreleaseList   SEQUENCE (SIZE (1..maxNrofSlots)) OF TDD-UL-DL-SlotIndex     OPTIONAL, -- Need N
    ...
}

TDD-UL-DL-SlotConfig ::=    SEQUENCE {
    slotIndex             TDD-UL-DL-SlotIndex,
    symbols               CHOICE {
        allDownlink           NULL,
        allUplink             NULL,
        allSidelink
        explicit              SEQUENCE {
            nrofDownlinkSymbols    INTEGER (1..maxNrofSymbols-1)    OPTIONAL, -- Need S
            nrofUplinkSymbols      INTEGER (1..maxNrofSymbols-1)    OPTIONAL, -- Need S
            nrofSidelinkSymbols    INTEGER (1..maxNrofSymbols-1)    OPTIONAL, --
            Need S
        }
        ...
    }
}

TDD-UL-DL-SlotIndex ::=    INTEGER (0..maxNrofSlots-1)

-- TAG-TDD-UL-DL-CONFIG-STOP
-- ASN1STOP
```

Override by S or U/S symbol

D D D D U U U D D D D U U U D D D D U U U

Packet generation

Max delay

| After / Before | D | U | F | S | U/S |
|---|---|---|---|---|---|
| D | Y | N | N | N | N |
| U | N | Y | N | Y | Y |
| F | Y | Y | Y | Y | Y |
| S | N | Y | Y | Y | Y |
| U/S | N | Y | Y | Y | Y |

Before: SYMBOL BEFORE OVERRIDE
After: OVERRIDEN SYMBOL
Y: OVERRIDABLE
N: NO OVERRIDE

BASE STATION DEVICE, METHOD OF CONTROLLING BASE STATION DEVICE, TERMINAL DEVICE, AND METHOD OF CONTROLLING TERMINAL DEVICE

CROSS-REFERENCE TO RELATED APPLICATIONS

The present application is based on PCT filing PCT/JP2020/016855, filed Apr. 17, 2020, which claims priority to JP 2019-086841, filed Apr. 26, 2019, the entire contents of each are incorporated herein by reference.

FIELD

The present disclosure relates to a base station device, a method of controlling a base station device, a terminal device, and a method of controlling a terminal device.

BACKGROUND

In recent years, a mobile communication system that supports communication for a mobile body has been proposed. In addition, mobile communication systems are required to support vehicle-to-everything (V2X) communication as communication for automobiles. Then, in the past V2X communication, development has been conducted based on LTE

CITATION LIST

Patent Literature

Patent Literature 1: JP 2017-208796 A

SUMMARY

Technical Problem

However, in the V2X communication, there are various use cases, and it is necessary to satisfy various requirements (for example, communication reliability, delay, or the like) in order to support the use cases. However, the conventional LTE-based V2X communication cannot sufficiently meet these requirements, which may result in poor communication performance.

Therefore, the present disclosure proposes a base station device, a method of controlling a base station device, a terminal device, and a method of controlling a terminal device that contribute to the realization of high communication performance.

Solution to Problem

A base station device includes communication unit and control unit. The communication unit communicates with the terminal device. When at least one symbol included in a slot format configured in the terminal device is a symbol for communication other than sidelink communication, the control unit transmit, to the terminal device, information for use by the terminal device as a symbol for sidelink communication with at least one symbol.

BRIEF DESCRIPTION OF DRAWINGS

FIG. 11 is a diagram illustrating an example of subcarrier spacing setting.
FIG. 27 is a diagram illustrating an example of configuration notification.

DESCRIPTION OF EMBODIMENTS

Figure 1:
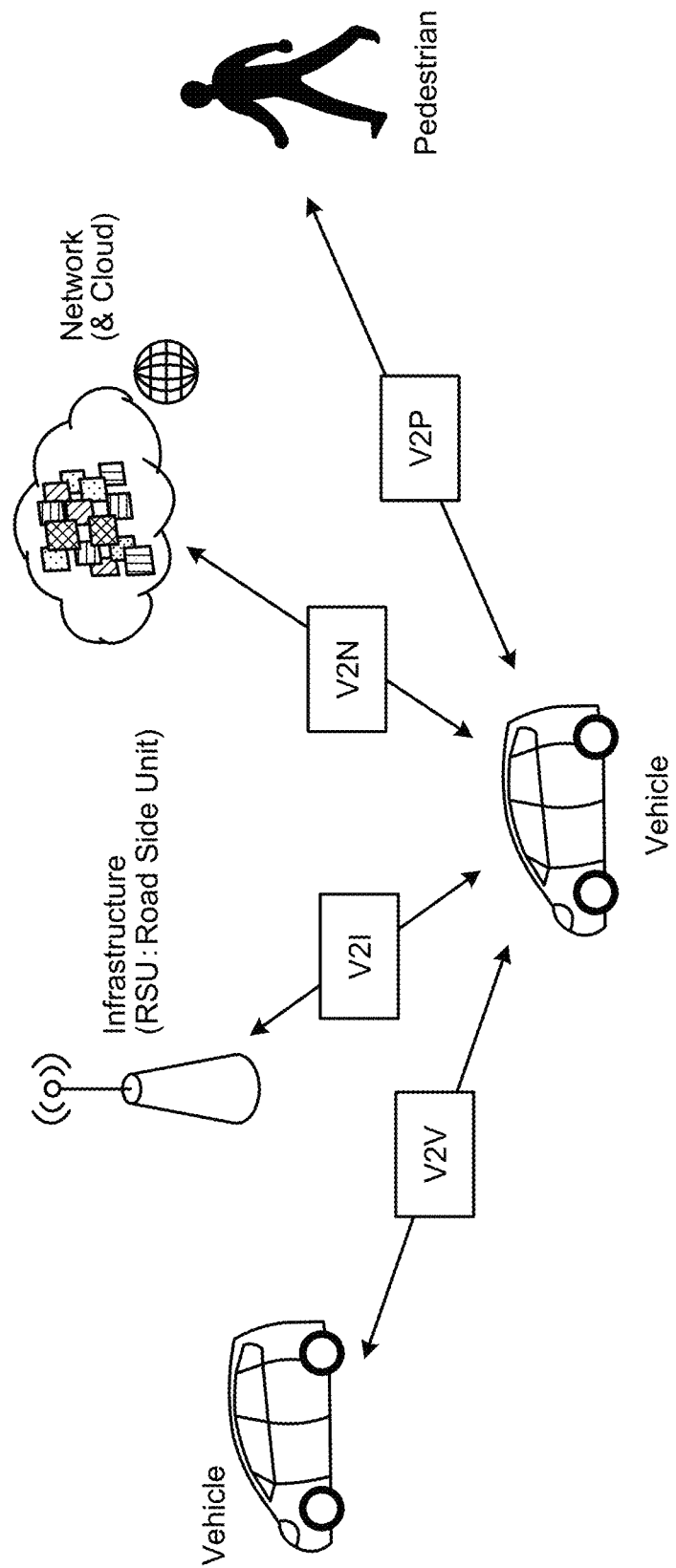
FIG. 1 is a diagram for describing V2X communication.

Hereinafter, embodiments of the present disclosure will be described in detail with reference to the accompanying drawings. Note that in each of the following embodiments, the same parts are designated by the same reference numerals, and therefore, duplicate description thereof will be omitted.

In addition, In this specification and the drawings, a plurality of components having substantially the same functional configuration may be distinguished from each other by adding different alphabets after the same reference numeral. For example, a plurality of configurations having substantially the same functional configuration are distinguished like a base station device $20_1$ and a base station device $20_2$, if necessary. However, when it is not necessary to particularly distinguish each of a plurality of components having substantially the same functional configuration, the plurality of components are denoted by only the same reference numerals. For example, when it is not necessary to distinguish between the base station device $20_1$ and $20_2$, it is simply referred to as a base station device 20.

In addition, the present disclosure will be described according to the order of items shown below.
1. Introduction
1-1. Overview of V2X communication
1-2. V2X use case
1-3. Physical layer enhancement
1-4. V2X operation scenario
1-5. Outline of present embodiment
2. Configuration of information processing system
2-1. Overall configuration of information processing system
2-2. Configuration of management device
2-3. Configuration of base station device (Network)
2-4. Configuration of base station device (Infrastructure)
2-5. Configuration of terminal device
2-6. Configuration of mobile device
3. Operation of information processing system
3-1. New design of slot format
3-2. Method of configuring slot format
3-3. Method of changing slot format
4. Modifications
5. Conclusion

1. INTRODUCTION

Conventionally, mobile communication systems have provided communication functions for mobile terminals such as mobile phones and smartphones. However, in recent years, it has become important for mobile communication systems to support communication for moving devices of a type different from that of mobile terminals, such as automobiles, drones, and robots.

For example, in recent years, mobile communication systems are required to support vehicle-to-everything (V2X) communication as communication for automobiles. Examples of communication for automobiles include road-to-vehicle communication realized by intelligent transportation systems (ITS) and the like, vehicle-to-vehicle communication realized by sidelink communication and the like, or the like. These communication technologies may become important technologies for realization of autonomous driving in the future.

Here, V2X communication is communication between a vehicle and "something". FIG. 1 is a diagram for describing V2X communication. Here, examples of "something" include vehicles, infrastructure, networks, pedestrians, and the like. Communication between vehicles is called vehicle-to-vehicle (V2V) communication. In addition, communication between a vehicle and an infrastructure is called vehicle-to-infrastructure (V2I) communication. In addition, communication between a vehicle and a network is called vehicle-to-network (V2N) communication. In addition, communication between a vehicle and a pedestrian is called vehicle-to-pedestrian (V2P) communication. In the present embodiment, a vehicle, an infrastructure, a network, and a pedestrian in the V2X may each communicate with the other as a user equipment (UE), or may communicate with the other as a base station. (radio access network).

1-1. Overview of V2X Communication

Figure 2:
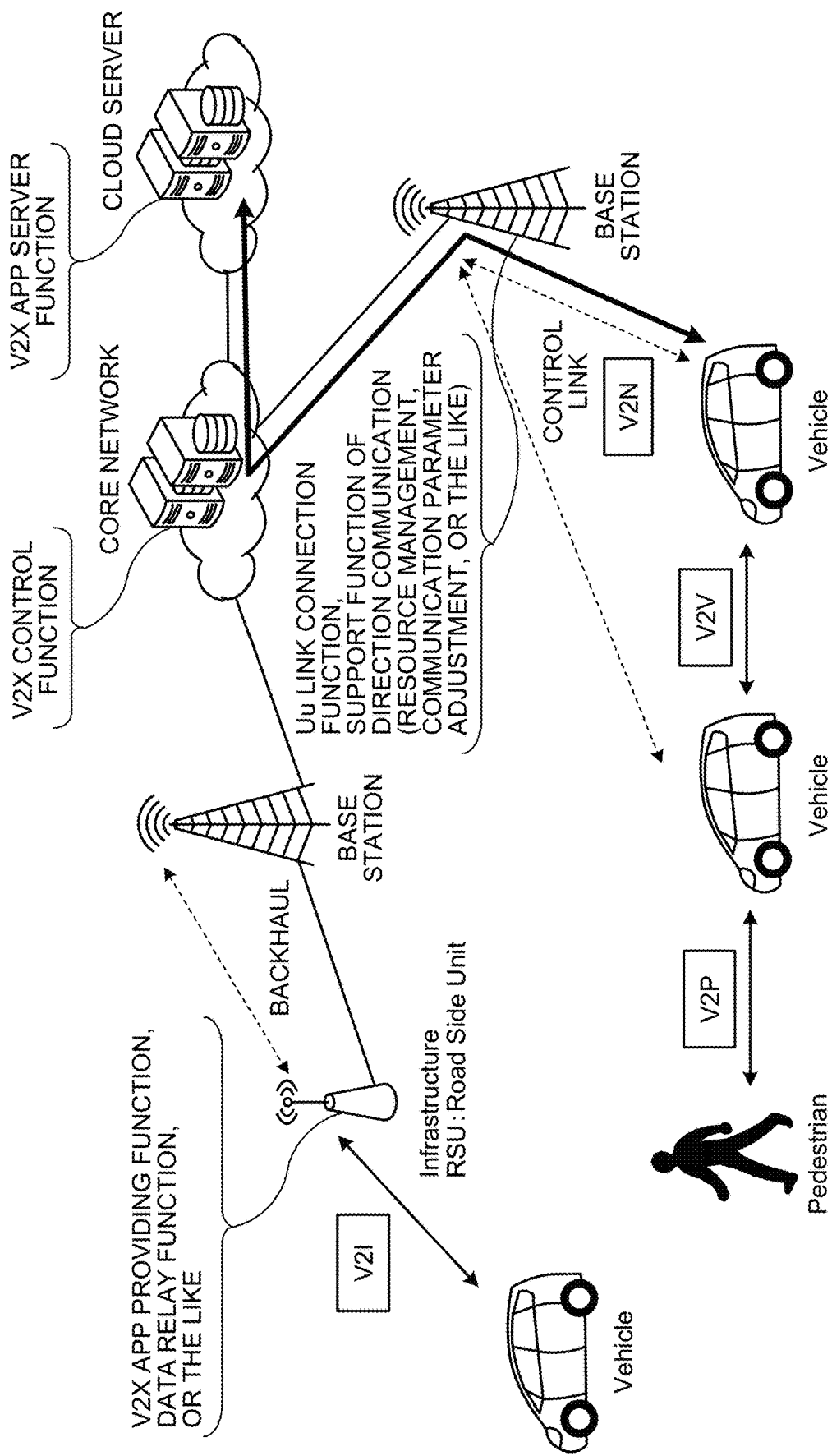
FIG. 2 is a diagram illustrating an example of an overall image of the V2X communication.

FIG. 2 is a diagram illustrating an example of an overall image of the V2X communication. In the example illustrated in FIG. 2, a cloud server has an application server (APP Server) function of the V2X. The cloud server is connected to a core network via a network such as the Internet. The core network is constituted by a device having a control function for V2X communication. A plurality of base stations are connected to the core network. The base station (RAN) has a function (for example, a Uu link connection function using a Uu interface) of wirelessly communicating with a terminal device (an example of UE, vehicle in the example of FIG. 2). In addition, the base station has a function of supporting direct communication (for example, sidelink communication) such as V2V communication and V2P communication. Note that a road side unit (RSU) is installed on a road as an infrastructure. There are two possible RSUs, a base station type RSU and a UE type RSU. The RSU has, for example, an APP providing function and a data relay function of the V2X.

1-2. V2X Use Case

As radio communication for automobiles, the development of 802.11p-based dedicated short range communication (DSRC) has been mainly promoted. However, in recent years, the standardization of "LTE-based V2X", which is an in-vehicle communication based on long term evolution (LTE), has been carried out. In the LTE-based V2X communication, the exchange of basic safety messages and the like is supported. In recent years, NR V2X communication using 5G technology (new radio (NR)) has been studied to further improve V2X communication.

Figure 3:
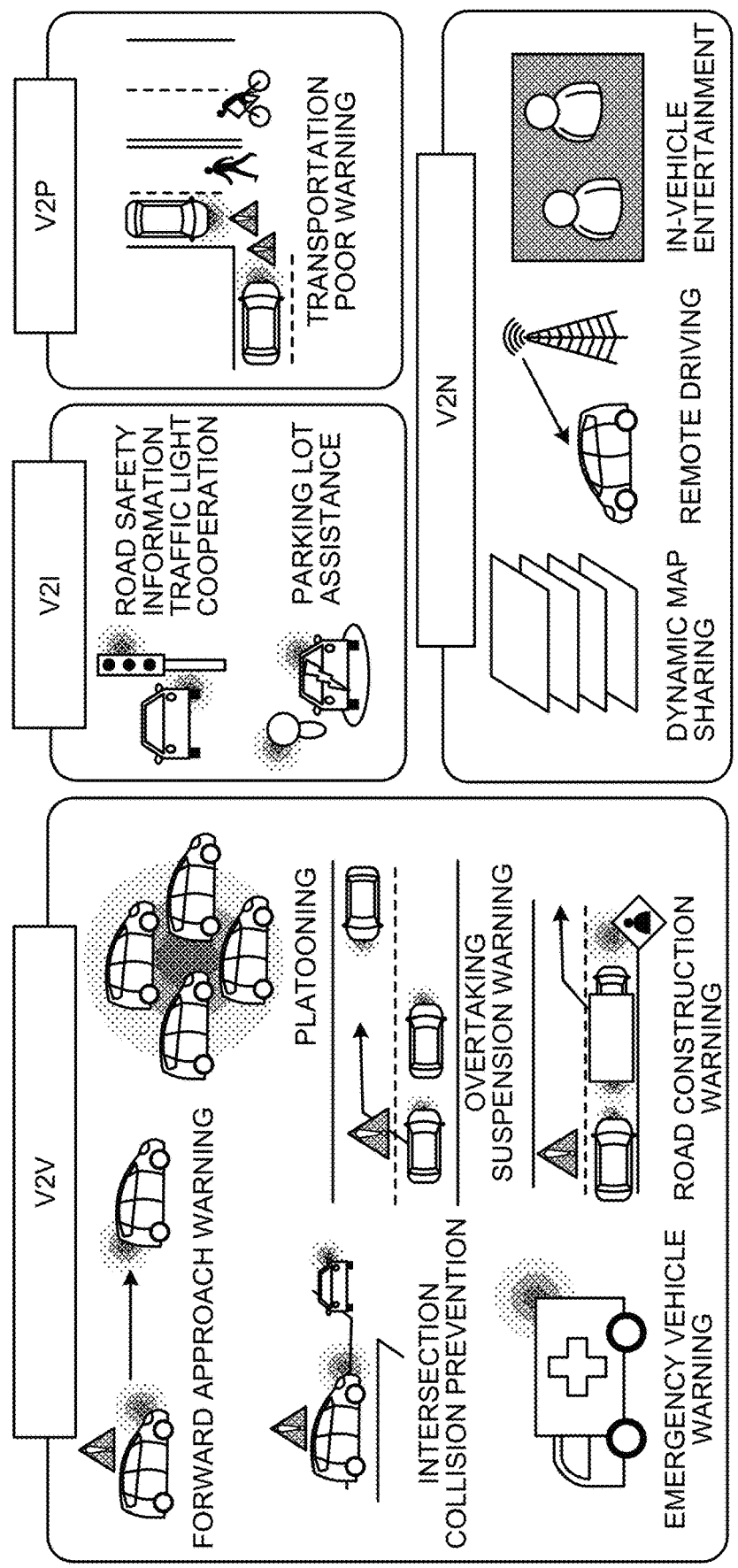
FIG. 3 is a diagram illustrating an example of a use case of the V2X communication.

FIG. 3 is a diagram illustrating an example of a use case of the V2X communication. Use cases of V2V communication include forward approach warning, intersection collision prevention, emergency vehicle warning, platooning, overtaking suspension warning, road construction warning, and the like. In addition, use cases of V2I communication include notification of road safety information, traffic light cooperation, parking lot assistance, billing, and the like. In addition, examples of use cases of V2P communication include transportation poor warnings or the like. In addition, use cases for V2N communication include dynamic link sharing, remote driving, in-house entertainment, and the like.

The NR V2X communication supports new use cases that require high reliability, low latency, high-speed communication, and high capacity, which LTE-based V2X could not support up to now. In the example of FIG. 3, for example, provision of a dynamic map, remote driving, and the like can be described. In addition to this, there are sensor data sharing in which sensor data is exchanged between vehicles and road vehicles, and platooning use cases for platooning. Use cases and requirements for these NR V2X communications are described in 3GPP TR22.886, and the like. The following (1) to (4) are brief explanations of some use cases.

(1) Vehicles Platooning

As a use case for NR V2X communication, there may be platooning. The platooning means that a plurality of vehicles form a platoon and travel in the same direction. Information for controlling the platooning is exchanged between the vehicle that leads the platooning and other vehicles. The NR V2X communication is used to exchange this information. By exchanging information using the NR V2X communication, it is possible to further reduce an inter-vehicle distance of the platooning.

(2) Extended Sensors

An example of the use case of the NR V2X communication may be the exchange of sensor-related information (raw data before data processing and processed data). The sensor information is collected through local sensors, live video images between surrounding vehicles, RSUs, or pedestrians, V2X application servers, and the like. By exchanging these information, the vehicle can obtain information that cannot be obtained by its own sensor information, and can recognize/recognize a wider range of environment. In this use case, a lot of information needs to be exchanged, so high data rate is required for communication.

(3) Advanced Driving

The use case of the NR V2X communication may include semi-autonomous driving and fully autonomous driving. The RSUs share cognition/recognition information obtained from their own sensors or the like with surrounding vehicles. As a result, each vehicle can adjust a trajectory or operation of a vehicle in synchronization and coordination. By using the NR V2X communication, each vehicle can also share the intention or purpose of driving with the surrounding vehicles.

(4) Remote Driving

The use case of the NR V2X communication can include remote control by remote pilots or V2X applications. The remote control can be used, for example, for people who cannot drive or in dangerous areas. Cloud computing-based maneuvers can also be used for public transport, where routes and roads are fixed to some extent. In the use case, communication requires high reliability and low transmission delay.

Note that the use cases shown above are just examples. The use cases of the V2X communication of the present embodiment may be use cases other than these

1-3. Physical Layer Enhancement

Further enhancement of the physical layer from LTE V2X is required to achieve the above requirements. A target link can include a Uu link, which is a link between an infrastructure such as a base station or an RSU and a terminal, and a PC5 link (sidelink) which is a link between the terminals. The following (1) to (9) are examples of major enhancement.

(1) Channel format
(2) Sidelink feedback communication
(3) Sidelink resource allocation method
(4) Vehicle position information estimation technology
(5) Relay communication between terminals
(6) Support for unicast communication and multicast communication
(7) Multi-carrier communication, carrier aggregation
(8) MIMO/beamforming
(9) High frequency support (example: 6 GHz or higher)

Note that (1) examples of channel format enhancement include flexible numerology, short transmission time interval (TTI), multi-antenna support, waveform, or the like. Further, (2) examples of the enhancement of the sidelink feedback communication may include HARQ, channel status information (CSI) and the like.

1-4. V2X Operation Scenario

Next, an example of a V2X communication operation scenario will be described. In the V2N communication, the communication between the base station and the terminal is simple with only DL/UL communication, but in the V2V communication, various communication paths can be considered. In the following description, each scenario will be described using an example of the V2V communication, but the same communication operation can be applied to V2P and V2I. In that case, a communication destination is not a vehicle, but a pedestrian, a base station, or an RSU.

(1) Scenario 1

Figure 4:
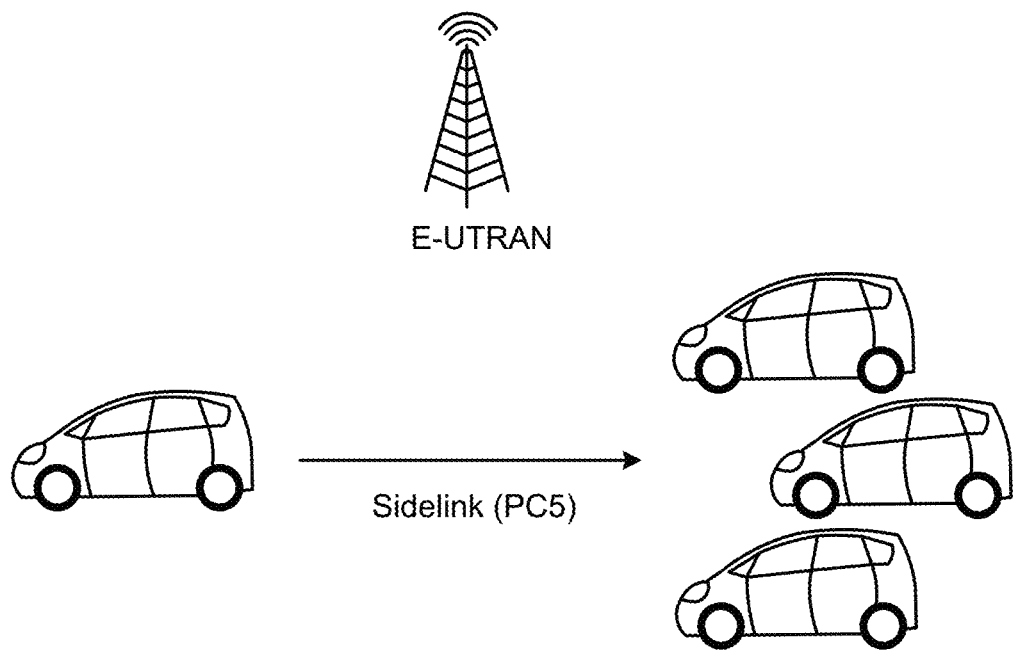
FIG. 4 is a diagram illustrating an example of the V2V communication according to scenario 1.

FIG. 4 illustrates an example of V2V communication according to scenario 1. In scenario 1, a vehicle (an example of UE) and a vehicle (an example of UE) communicate directly using sidelink communication. A sidelink is a communication link between terminals such as PC5. In addition to the PC5, the sidelink is sometimes called a V2V communication link, a V2P communication link, a V2I communication link, or the like. In the example of FIG. 4, vehicles directly communicate with each other using sidelink communication without going through a radio access network. In the example of FIG. 4, an evolved universal terrestrial radio access network (E-UTRAN) is shown as a radio access network, but the radio access network is not limited to the E-UTRAN. For example, the radio access network may be NG-RAN.

(2) Scenario 2

Figure 5:
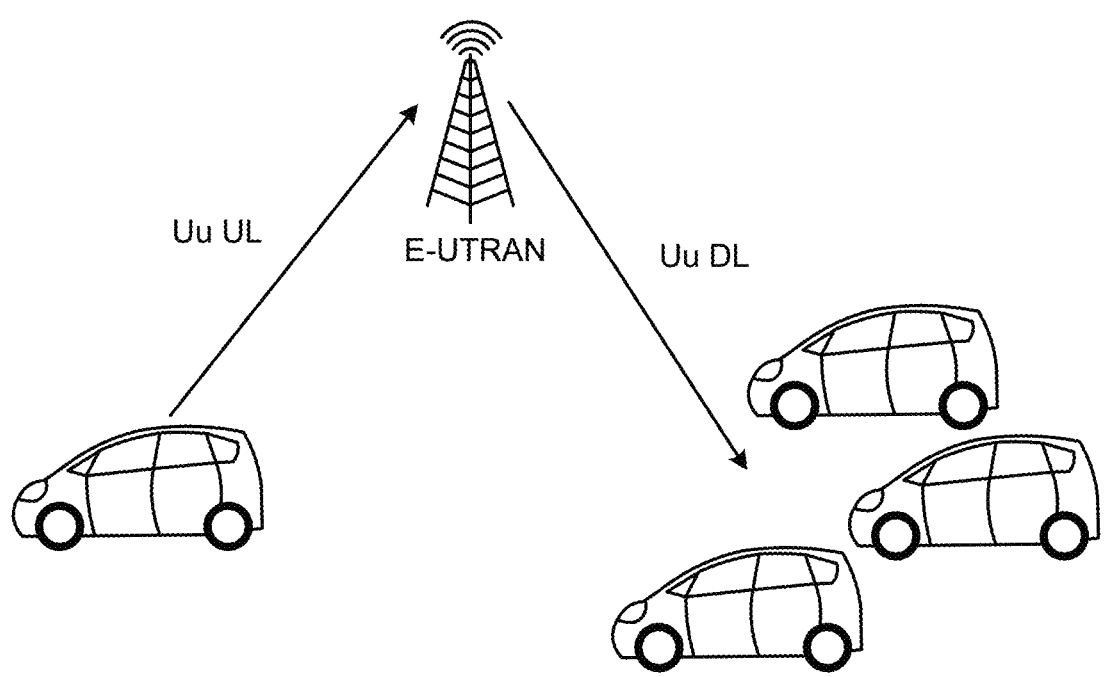
FIG. 5 is a diagram illustrating an example of the V2V communication according to scenario 2.

FIG. 5 illustrates an example of V2V communication according to scenario 2. In scenario 2, vehicles (an example of UE) communicate with each other via a radio access network. In the example of FIG. 5, data is transmitted from one vehicle to a plurality of vehicles. Note that in FIG. 5, Uu indicates a Uu interface. The Uu interface is a wireless interface between a terminal and a base station. UL indicates uplink and DL indicates downlink. Even in the example of FIG. 5, the E-UTRAN is shown as the radio access network, but the radio access network is not limited to the E-UTRAN. For example, the radio access network may be NG-RAN.

(3) Scenario 3

Figure 6:
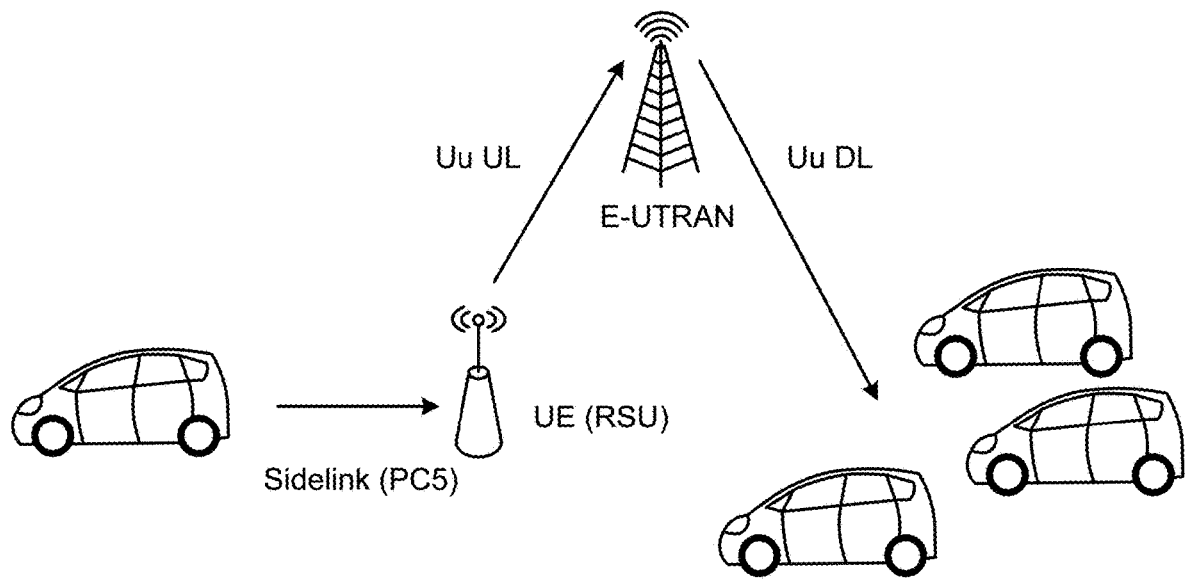
FIG. 6 is a diagram illustrating an example of the V2V communication according to scenario 3.

FIG. 6 illustrates an example of V2V communication according to scenario 3. In scenario 3, vehicles communicate with each other via the RSU and the radio access network. Even in the example of FIG. 6, data is transmitted from one vehicle to a plurality of vehicles. In the example of FIG. 6, one car and the RSU are connected to each other by sidelink communication. Even in the example of FIG. 6, the E-UTRAN is shown as the radio access network, but the radio access network is not limited to the E-UTRAN. For example, the radio access network may be NG-RAN. Also, in FIG. 6, the RSU is shown as a device that operates as a UE, but is not limited thereto. For example, the RSU may operate as a RAN or as part of the RAN (E-UTRAN or NG-RAN) in FIG. 6 (for example, gNB-DU, RRH, and RRU).

(4) Scenario 4

Figure 7:
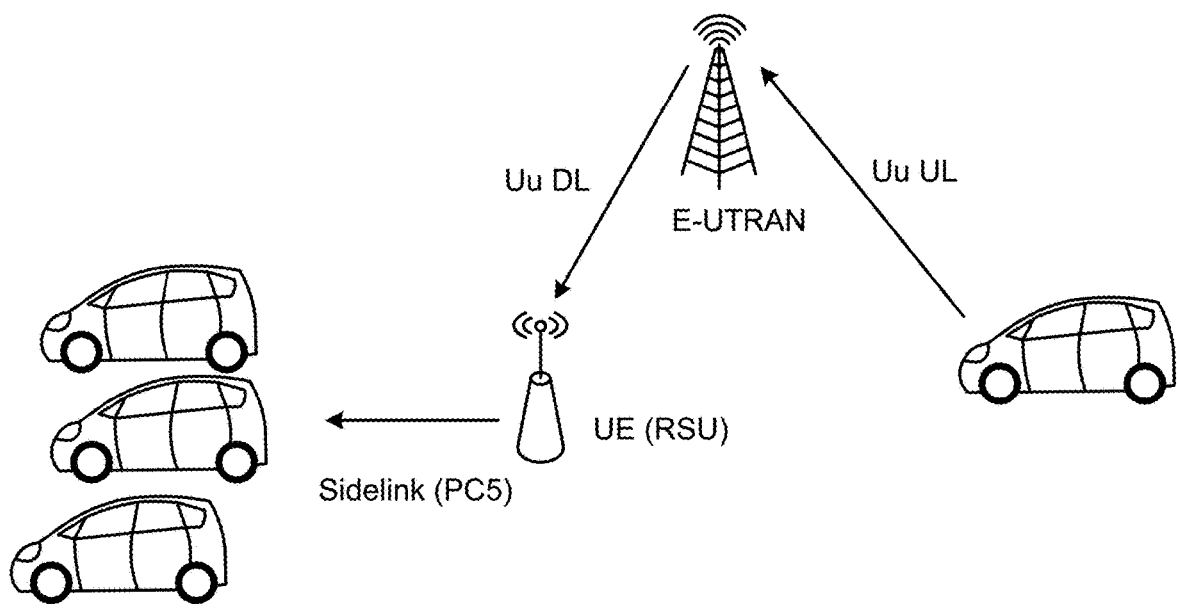
FIG. 7 is a diagram illustrating an example of the V2V communication according to scenario 4.

FIG. 7 illustrates an example of V2V communication according to scenario 4. In scenario 4, vehicles communicate with each other via the RSU and the radio access network. In the example of FIG. 7, a plurality of vehicles and the RSU are connected to each other by the sidelink communication. Even in the example of FIG. 7, the E-UTRAN is shown as the radio access network, but the radio access network is not limited to the E-UTRAN. For example, the radio access network may be NG-RAN. Also, in FIG. 6, the RSU is shown as a device that operates as a UE, but is not limited thereto. For example, the RSU may operate as a RAN or as part of the RAN (E-UTRAN or NG-RAN) in FIG. 6 (for example, gNB-DU, RRH, and RRU).

(5) Scenario 5

Figure 8:
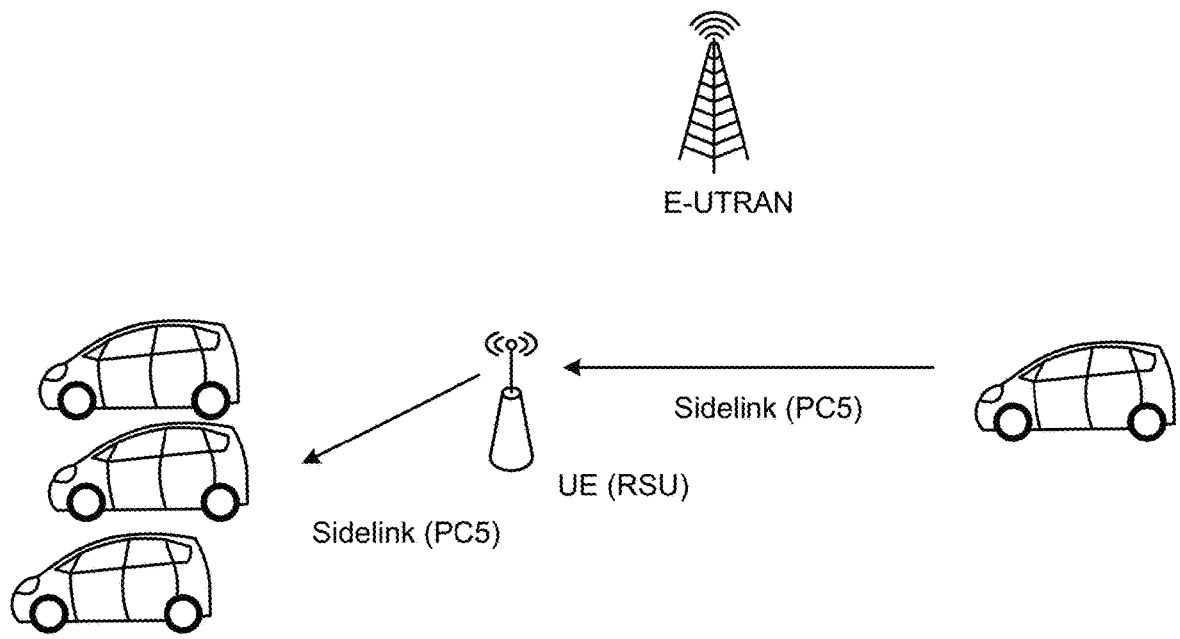
FIG. 8 is a diagram illustrating an example of the V2V communication according to scenario 5.

FIG. 8 illustrates an example of V2V communication according to scenario 5. In scenario 5, vehicles communicate with each other via the RSU without going through the radio access network. The RSU illustrated in FIG. 8 is a fixed station type RSU. For example, the radio access network may be NG-RAN. Also, in FIG. 6, the RSU is shown as a device that operates as a UE, but is not limited thereto. For example, the RSU may operate as a RAN or as part of the RAN (E-UTRAN or NG-RAN) in FIG. 6 (for example, gNB-DU, RRH, and RRU).

(6) Scenario 6

Figure 9:
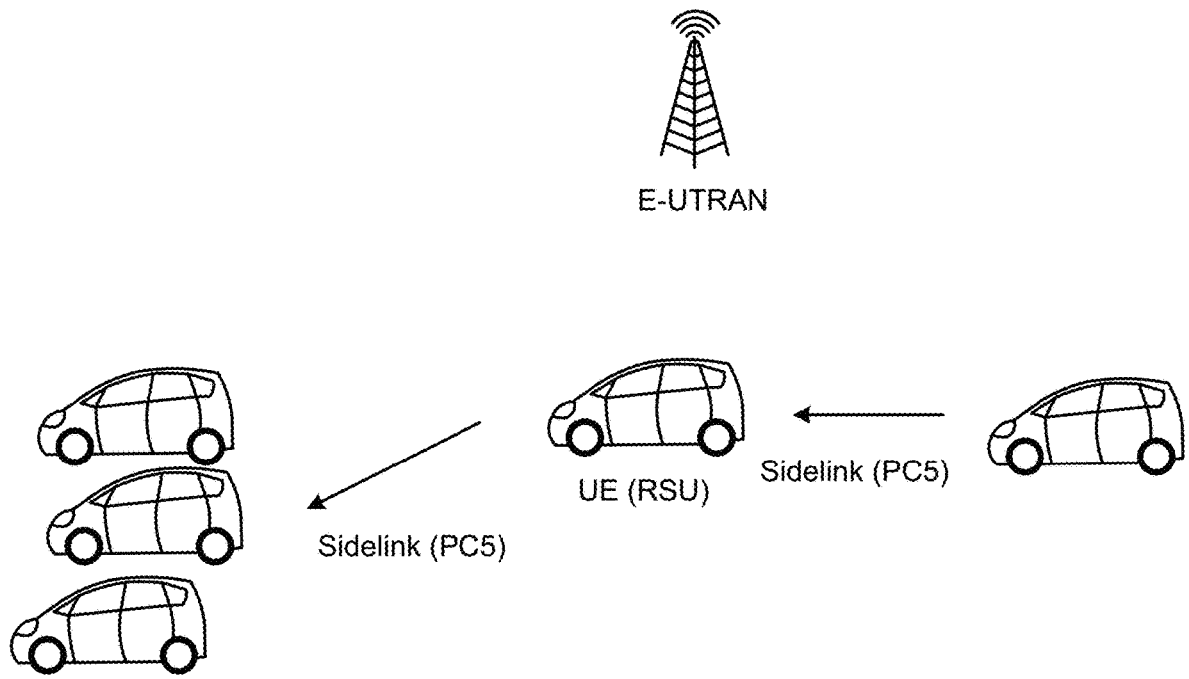
FIG. 9 is a diagram illustrating an example of the V2V communication according to scenario 6.

FIG. 9 illustrates an example of V2V communication according to scenario 6. In scenario 6, vehicles communicate with each other via the RSU without going through the radio access network. The RSU illustrated in FIG. 9 is a mobile station type RSU.

1-5. Outline of Present Embodiment

In the past V2X communication (for example, 3GPP Re1.12 or later V2X communication), LTE radio frame was used. For example, in the conventional V2X communication, sidelink communication such as sidelink control channel (physical sidelink control channel (PSCCH)) and sidelink data channel (physical sidelink shared channel (PSSCH)) has been performed using an LTE wireless frame.

On the other hand, when the LTE wireless frame is used in the NR V2X communication, for example, the requirements in the above scenarios 1 to 6 may not be satisfied. In other words, in the NR V2X communication, for example, when performing high-speed large-capacity communication (eMBB), performing low-latency high-reliability (URLLC) communication, or the like on one vehicle (an example of UE), it is required to support requests of different service types. However, in the frame configuration of LTE, for example, when performing the URLLC communication, there is a possibility that the requirement of the ultra-latency cannot be satisfied. Therefore, in the NR V2X communication, for example, when performing the URLLC communication, it is preferable to use the numerology and frame configuration of NR instead of using the frame configuration of LTE. In other words, in the NR V2X communication, it is preferable to use the numerology and frame configuration of NR for the NR sidelink communication in order to meet the requests of different services.

[Frame Configuration of NR]

Figure 10:
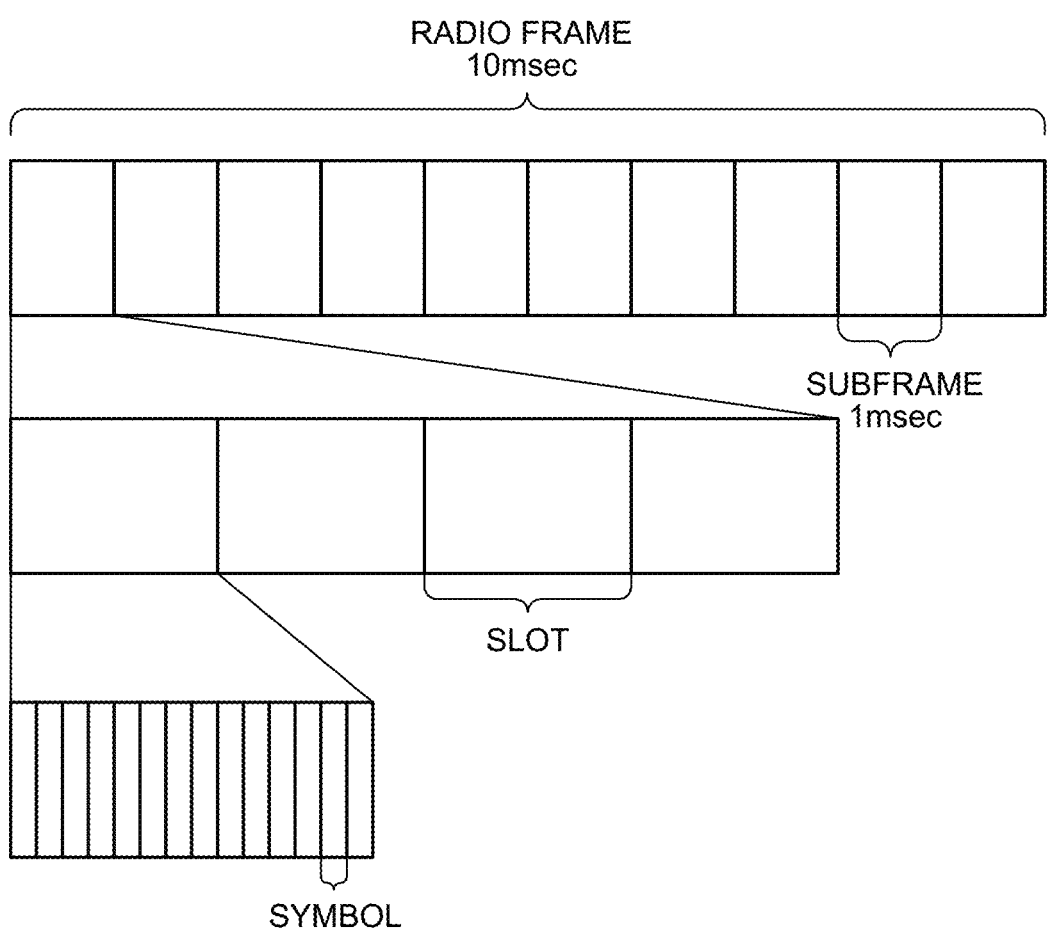
FIG. 10 is a diagram illustrating a frame configuration of NR.

Here, the frame configuration of NR will be described with reference to FIG. 10 FIG. 10 is a diagram illustrating a frame configuration of NR. As illustrated in FIG. 10, one radio frame is composed of 10 ms. One radio frame is composed of two half frames. A time interval for one half frame is 5 ms. In addition, one half frame is composed of five subframes. A time interval for one subframe is 1 ms. In addition, one subframe is composed of one or more slots. FIG. 10 illustrates an example in which one subframe is composed of four slots. In addition, a time interval of each slot differs depending on the numerology (OFDM numerology). In addition, the numerology is defined by a combination of subcarrier spacing (SCS: Subcarrier Spacing) and cyclic prefix (CP).

FIG. 11 is a diagram illustrating an example of subcarrier spacing setting. As illustrated in FIG. 11, the subcarrier spacing is defined by a power of 2 relative to 15 kHz. Specifically, the subcarrier interval is set to 15 kHz, 30 kHz, 60 kHz, 120 kHz, and 240 kHz. When the subcarrier spacing is 15 kHz, the number of slots per subframe is one. That is, when the subcarrier spacing is 15 kHz, the time interval of the slot is 1 ms, when the subcarrier spacing is 30 kHz, the time interval of the slot is 0.5 ms, when the subcarrier spacing is 60 kHz, the time interval of the slot is 0.25 ms, when the subcarrier spacing is 120 kHz, the time interval of the slot is 0.125 ms, and when the subcarrier spacing is 240 kHz, the time interval of the slot is 0.0625 ms. Further, as illustrated in FIG. 11, the number of symbols in one slot is 14 in the case of the normal CP (cyclic prefix) and 12 in the case of the extended CP.

[Resource Grid]

Figure 12:
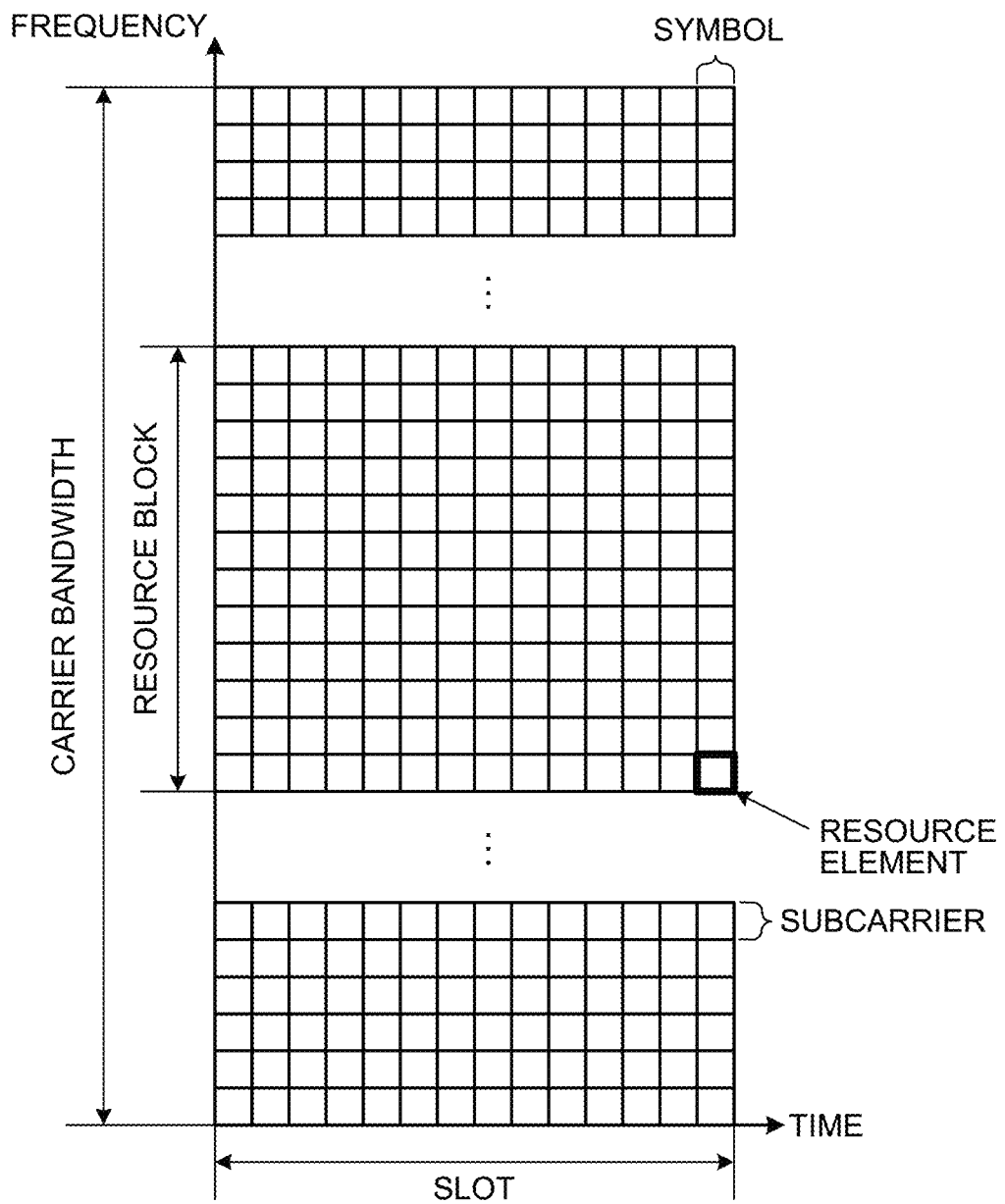
FIG. 12 is a diagram illustrating an example of a resource grid.

Next, a resource grid will be described with reference to FIG. 12. FIG. 12 is a diagram illustrating an example of the resource grid. In this embodiment, the transmitted physical signal or physical channel are represented by a resource grid in their respective numerologies and subcarriers. The resource grid is defined by a plurality of resource elements. One resource element at a given antenna port is represented by one subcarrier and one symbol. That is, an index of the resource element at a predetermined antenna port can be represented by a combination of the subcarrier index and the symbol index.

Further, in the present embodiment, a resource block (RB) is defined as a unit in a frequency axis direction. One resource block is composed of 12 subcarriers that are continuous in the frequency axis direction. In addition, as the resource blocks, there are a common resource block (CRB), a physical resource block (PRB), and a virtual resource block (VRB). A common resource block is a resource block defined by a predetermined frequency bandwidth and a predetermined numerology. The common resource block starts at point A in all numerologies. A frequency specified at point A is a center of subcarrier #0 of common resource block #0 in all numerologies. A physical resource block is a resource block defined within a predetermined frequency bandwidth part. In addition, the physical resource block index is numbered from 0 within its predetermined frequency bandwidth part. A virtual resource block is a logical resource block. The virtual resource block is used, for example, when mapping a signal after precoding of a physical downlink shared channel (PDSCH) or a physical uplink shared channel (PUSCH) to a physical resource block.

[Slot Format]

Figure 13:
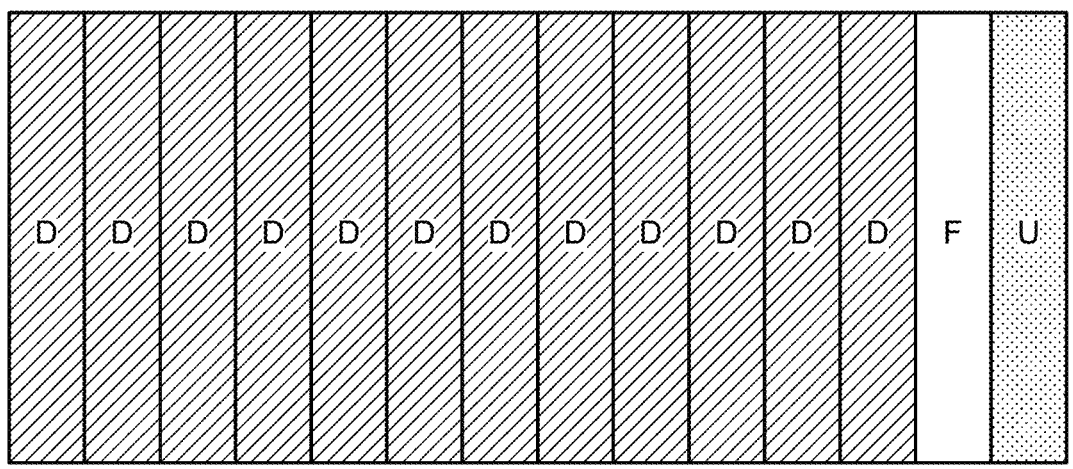
FIG. 13 is a diagram illustrating a slot format.
Figure 14:
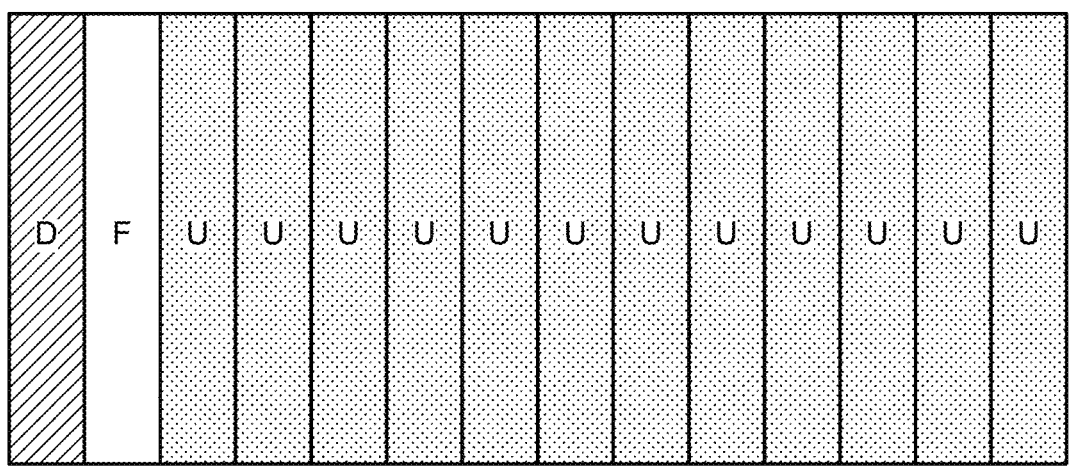
FIG. 14 is a diagram illustrating the slot format.

Next, the slot format indicating the state of the symbols included in the slot will be described. FIGS. 13 and 14 are diagrams illustrating the slot format. In a time division duplex (TDD) cell (unpaired spectrum), each symbol included in a slot can be classified into a downlink (DL), uplink (UP), or flexible state. In FIGS. 13 and 14, the downlink is referred to as "D", the uplink is referred to as "U", and the flexible is referred to as "F". Note that in the following, the downlink may be referred to as "downlink" and the uplink may be referred to as "uplink".

For example, when receiving information from a base station, the terminal device receives the information by using the downlink symbol in the slot format. In addition, the terminal device uses the uplink symbol in the slot format when transmitting information to the base station. In addition, the terminal device can be used to transmit or receive information to and from the base station for the flexible symbol in the slot format. Alternatively, the flexible symbol may be used as a downlink and uplink switching period or guard period.

The state of each symbol in the slot format is configured by the information transmitted from the base station. Specifically, a state of each symbol is specified in TDD configuration information (TDD-UL-DL-ConfigurationCommon) common (for example, cell specific) to the terminal devices which is included in a radio resource control (RRC) message (for example, SystemInformationBlockType1 (SIB1), RRCSetup message, RRCReconfiguration message) transmitted from the base station or TDD configuration information (TDD-UL-DL-ConfigDedicated) of an individual terminal device (UE specific).

For example, the TDD configuration information common to the terminal devices includes the following information (1) to (5).
  (1) The number of downlink slots (for example, nrofDownlinkSlots) and the number of downlink symbols (for example, nrofDownlinkSymbols)
  (2) The number of uplink slots (for example, nrofUplinkSlots) and the number of uplink symbols (for example, nrofUplinkSymbols)
  (3) Information on uplink/downlink switching periodicity (for example, DL-UL-TransmissionPeriodicity)
  (4) Index of target slot (for example, slotIndex)
  (5) Information on each symbol in target slot. For example, all downlinks (all DL), all uplinks (all UL), the number of downlink symbols (for example, nrofDownlinkSymbols), and the number of uplink symbols (for example, nrofUplinkSymbols).

Further, or instead, the state of each symbol may be specified by a slot format index transmitted by DCI (for example, DCI format 2_0). Specifically, the slot format index is a slot format index that indicates a combination of 14 symbol states. In addition, the slot format index is specified on a slot-by-slot basis. Note that a format that specifies the slot format is also called a slot format indicator (SFI). The terminal device can configure or change uplink, downlink, and flexible symbols on a symbol-by-symbol basis, and recognize (consider) the symbol to be used based on the TDD configuration information described above or the slot format index specified by DCI.

Further, or instead, the state of each symbol may be determined by the slot format specified by the combination of the RRC signaling and the DCI (for example, DCI format 2_0). Specifically, one or a plurality of SlotFormats may be preset by RRC signaling, and SFI Index(s) included in the DCI format 2_0 may determine one or a plurality of SlotFormats to be used by UE. The one or the plurality of SlotFormats may be included in one or a plurality of SlotFormatCombinations included in the RRC signaling. In this way, the terminal device can configure or change the uplink, downlink and flexible symbols on a symbol-by-symbol basis by combining RRC signaling and DCI (for example, DCI format 2_0), and recognize (consider) the symbol to be used.

Note that the slot format configured in the terminal device may be a kind of slot configuration configured in the terminal device. That is, in the present invention, the slot format may be referred to as a slot configuration. Here, the slot configuration includes configuration information on one or a plurality of symbols in one or a plurality of slots. The configuration information on one or the plurality of symbols includes information (RRC and DCI parameters) on symbols described above or later.

FIGS. 13 and 14 illustrates slot formats that represent states of 14 symbols. For example, in the slot format illustrated in FIG. 13, it is illustrated that first to twelfth symbols are downlink symbols (D), a thirteenth symbol is a flexible symbol (F), and a fourteenth symbol is an uplink symbol (U). The SFI for specifying the slot format illustrated in FIG. 13 is "DDDDDDDDDDDDFU" in order from a first symbol of the slot. This makes it possible to transmit and receive HARQ-ACK corresponding to PDSCH, for example, in the same slot.

In addition, for example, in the slot format illustrated in FIG. 14, it is illustrated that a first symbol is a downlink symbol (D), a second symbol is a flexible symbol (F), and third to fourteenth symbols are an uplink symbol (U). The SFI for specifying the slot format illustrated in FIG. 14 is "DFUUUUUUUUUUUU" in order from the first symbol of the slot. This makes it possible to transmit and receive PUSCH corresponding to an UL grant, for example, in the same slot.

Note that in the conventional LTE V2X communication, a subframe for uplink communication may be used for sidelink communication in the LTE frame configuration. In other words, while the conventional LTE V2X communication is configured in subframe units, the NR V2X communication has the advantage that it can be configured in symbol units.

However, when performing the NR V2X communication, as described above, there are only definitions of the uplink, downlink, and flexible symbols in the current slot format of the NR. In other words, the current slot format of the NR does not define a symbol for sidelink communication or an operation for performing the sidelink communication. Therefore, when performing the NR V2X communication, it is difficult to use the current slot format of the NR, in which the symbol for the sidelink communication cannot be configured, without changing Therefore, when performing the NR V2X communication, it is necessary to define a new slot format (symbol) capable of the sidelink communication or to specify a new operation for performing the sidelink communication.

Therefore, in the present embodiment, when at least one symbol included in the slot format (slot configuration) configured in the terminal device is a symbol for communication other than the sidelink communication, the base station transmit, to the terminal device, information for use by the terminal device as the symbol for the sidelink communication with at least one symbol.

As a result, in the present embodiment, the terminal device can perform the sidelink communication using the slot format of the NR. In other words, by using the slot format of the NR, it is possible to meet the requirements of various services in the NR V2X communication, and thus high communication performance can be achieved.

Note that the above-described "symbol for performing communication other than sidelink communication" is, for example, a symbol for performing uplink communication (uplink symbol) or a flexible symbol capable of performing uplink communication or downlink communication, but details of these symbols will be described later.

In addition, the above-described "information for terminal device to use as a symbol for sidelink communication" is, for example, the slot format information in which the symbol for the sidelink communication is configured, or the existing symbol is information used for the sidelink communication, but details thereof will be described later.

Hereinafter, the present embodiment will be described in detail.

2. CONFIGURATION OF INFORMATION PROCESSING SYSTEM

Figure 15:
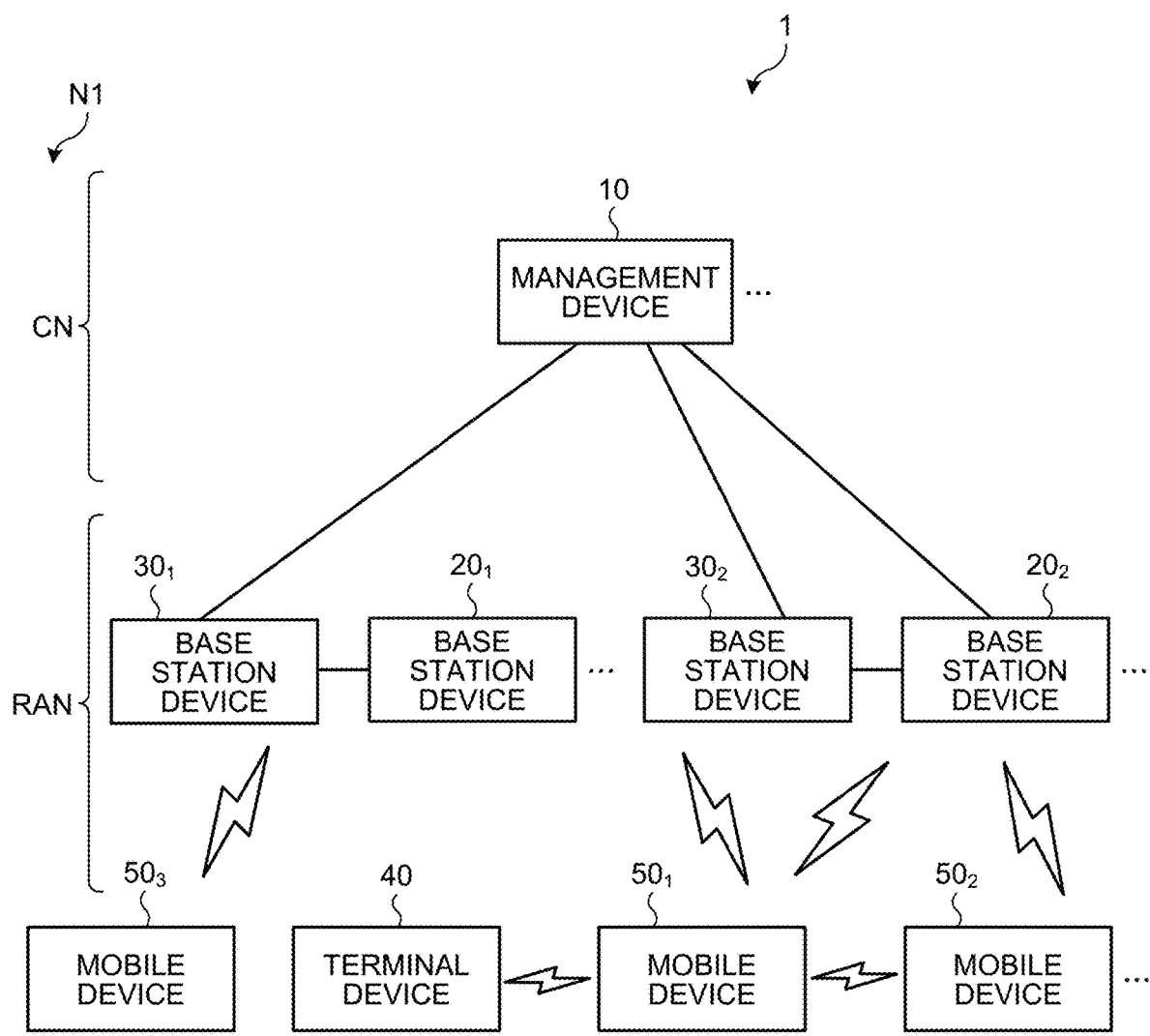
FIG. 15 is a diagram illustrating a configuration example of an information processing system according to an embodiment of the present disclosure.

First, an information processing system 1 according to the embodiment of the present disclosure will be described with reference to FIG. 15. FIG. 15 is a diagram illustrating a configuration example of the information processing system 1 according to an embodiment of the present disclosure. The information processing system 1 illustrated in FIG. 15 is a mobile communication system including a plurality of communication devices (mobile device and terminal device) capable of sidelink communication.

The information processing system 1 is, for example, a radio communication system using radio access technology (RAT) of new radio (NR). The radio communication system is also called a 5th generation system (5GS). At this time, the information processing system 1 is not limited to a mobile phone communication system, and may be, for example, an intelligent transport system (ITS). Note that the information processing system 1 is not limited to a cellular communication system, and may be, for example, other radio communication systems such as a wireless local area network (LAN) system, an aeronautical wireless system, or a space radio communication system.

The information processing system 1 may provide an application processing execution function (for example, an edge function) to a mobile device via a wireless network using the radio access technology of the NR. The NR is a type of cellular communication technology, and enables mobile communication of a mobile device by arranging a plurality of areas covered by the base station device in a cell shape.

In the following description, the NR includes new radio access technology (NRAT) and further EUTRA (FEUTRA). Note that a single base station may manage a plurality of cells. A cell corresponding to the NR is sometimes called an NR cell.

The NR is the next generation (5th generation) radio access technology (RAT) of LTE (4th generation communication including LTE-Advanced and LTE-Advanced Pro). The NR is a radio access technology that can correspond to various use cases including enhanced mobile broadband (eMBB), massive machine type communications (mMTC), and ultra-reliable and low latency communications (URLLC). The NR is being studied to create a technical framework that supports usage scenarios, requirements, deployment scenarios, or the like for these use cases.

The base station of the NR can be called a next generation RAN (NGRAN) node. The NGRAN refers to RAN (RAN with a reference point with 5GC) when a core network is a 5G core (5GC). That is, the NGRAN may include gNodeB (gNB) and ng-eNodeB (ng-eNB). In addition, in the NR, the mobile device are sometimes called a user equipment (UE).

2-1. Overall Configuration of Information Processing System

Figure 16:
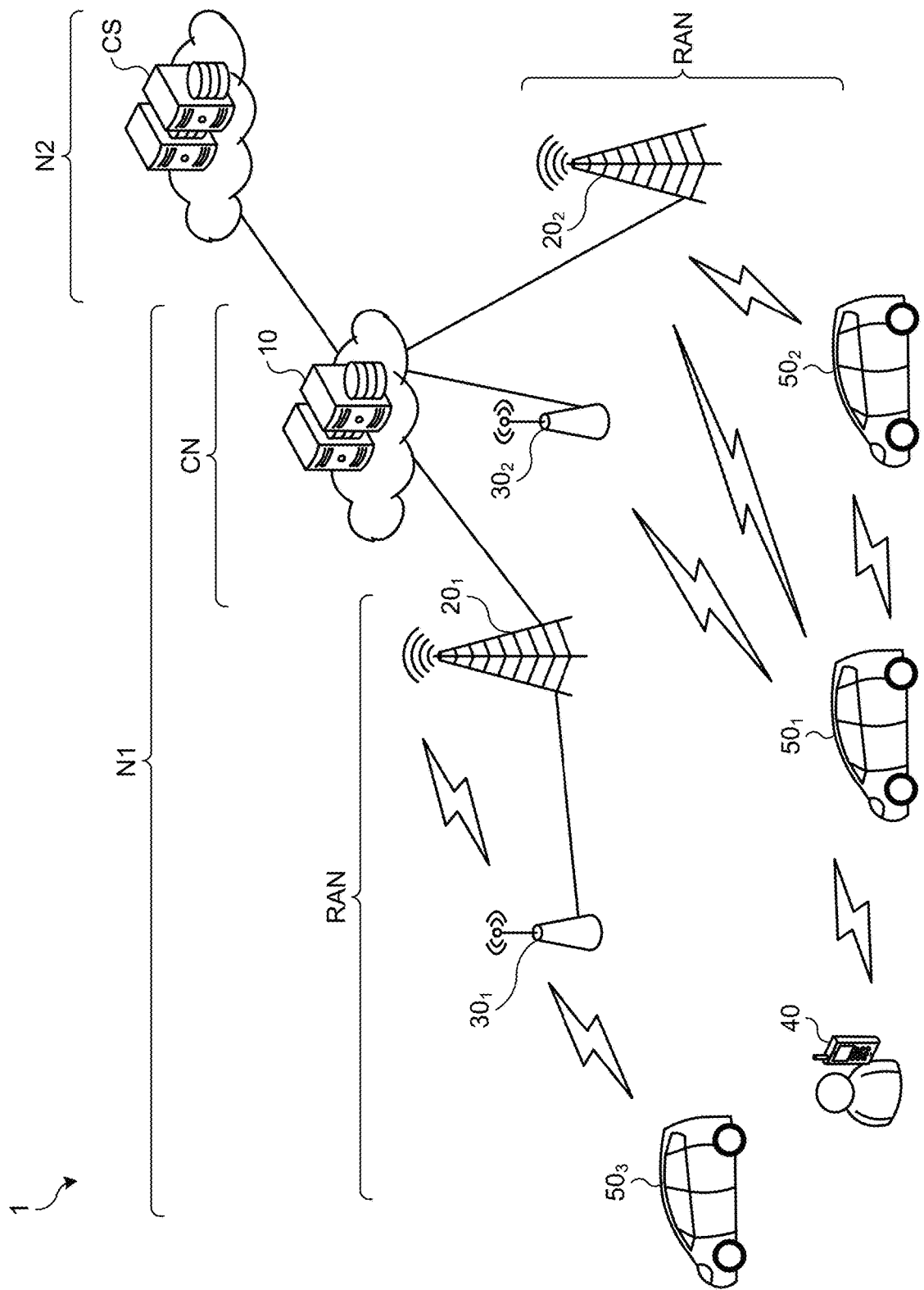
FIG. 16 is a diagram illustrating a specific configuration example of the information processing system.

As illustrated in FIG. 15, the information processing system 1 includes a management device 10, a base station device 20, a base station device 30, a terminal device 40, and a mobile device 50. In addition, FIG. 16 is a diagram illustrating a specific configuration example of the information processing system 1. The information processing system 1 may have a cloud server device CS in addition to the above configuration, but may not be an indispensable component.

A network N1 is constituted by the plurality of devices that configure the information processing system 1. The network N1 is, for example, a wireless network. For example, the network N1 is a mobile communication network configured using the radio access technology such as the NR. The network N1 is constituted by a radio access network RAN and a core network CN.

Note that the device in the figure may be considered as a device (logical node) in a logical sense. In other words, some of the devices in the figure are realized by a virtual machine (VM), a container, a docker, and the like, and may be implemented on the same physically hardware.

[Cloud Server Device]

The cloud server device CS is a processing device (for example, a server device) connected to a network N2. For example, the cloud server device CS is a server host computer that processes requests from client computers (for example, mobile device 50). The cloud server device CS may be a PC server, a midrange server, or a mainframe server. Here, the network N2 is a communication network connected to the network N1 via a gateway device (for example, UPF, S-GW, or P-GW). That is, the network N2 is a data network (DN). Further, for example, the network N2 is a communication network such as the Internet, a regional internet protocol (IP) network, and a telephone network (for example, a fixed telephone network and a mobile telephone network). Note that the cloud server device can be rephrased as a server device, a processing device, or an information processing device.

[Management Device]

The management device 10 is a device that manages a wireless network. For example, the management device 10 is a device that functions as an access and mobility management function (AMF). The management device 10 configures a part of the core network CN together with a gateway device. The core network CN is a network owned by a predetermined entity (subject) such as a mobile communication operator. For example, the core network CN is a 5G core network (5GC). Note that the predetermined entity may be the same as or different from the entity that uses, operates, and/or manages the base station devices 20 and 30.

Note that the management device 10 may have a gateway function. For example, when the core network is the 5GC, the management device 10 has a function as a user plane function (UPF). Further, the management device 10 may be SMF, PCF, UDM, or the like. Alternatively, the core network CN may include SMF, PCF, UDM, or the like.

The management device 10 is connected to a plurality of base station devices 20 and a plurality of base station devices 30, respectively. For example, in the case of the 5GS, there is an N2 reference point between AMF 10 and NG-RANs 20 and 30, and the AMF 10 and the NG-RANs 20 and 30 are logically connected to each other via the NG interface. The management device 10 may manage the communication of the base station device 20 and the base station device 30. For example, the management device 10 manages at which location the mobile device 50 in the network N1 exists for each mobile device 50 in an area unit (for example, a tracking area and an RAN notification area) composed of a plurality of cells. Note that the management device 10 may grasp and manage to which base station device (or to which cell) the mobile device 50 is connected, of which base station device (or cell) the mobile device 50 exists in a communication area, or the like in units of cells for each mobile device. A cell provided by the base station is called a serving cell. The serving cell includes a primary cell (PCell) and a secondary cell (SCell). When dual connectivity (for example, EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity) is provided to UE (for example, a terminal device 40 and a mobile device 50), the PCell and the SCell(s) provided by a master node (MN) are called a master cell group. Furthermore, the serving cell may include a primary secondary cell or primary SCG cell (PSCell). That is, when the dual connectivity is provided to the UE, the PSCell and SCell(s) provided by the secondary node (SN) are called a secondary cell group (SCG). One downlink component carrier and one uplink component carrier may be associated with one cell. In addition, the system bandwidth corresponding to one cell may be divided into a plurality of bandwidth parts. In this case, one or a plurality of bandwidth parts may be set in the UE and one bandwidth part may be used by the UE as active BWP. In addition, radio resources (for example, frequency band, numerology (subcarrier spacing), slot format (slot configuration)) that can be used by the mobile device 50 may differ for each cell, each component carrier, or each BWP.

[Base Station Device]

The base station device 20 is a radio communication device that wirelessly communicates with the terminal device 40 and the mobile device 50. The base station device 20 is a device that constitutes a network in V2N communication. The base station device 20 is a type of communication device. As described above, the base station device 20 may be a device corresponding to a radio base station (base station, Node B, eNB, gNB, or the like) or a radio access point. Further or instead, when the base station device is eNB, gNB, or the like, the base station may be referred to as 3GPP access. Further or instead, when the base station device is a radio access point, the base station may be referred to as non-3GPP access. Further or instead, the base station device 20 may be a radio relay station (Relay Node). Further or instead, the base station device 20 may be an optical overhanging device called a remote radio head (RRH). Further or instead, when the base station device is gNB, the base station device may be referred to as a combination of a gNB central unit (gNB CU) and a gNB distributed unit (gNB DU), or any of these. The gNB central unit (gNB CU) hosts a plurality of upper layers (for example, RRC, SDAP, PDCP) of an access stratum for communication with the UE. On the other hand, the gNB-DU hosts a plurality of lower layers (for example, RLC, MAC, PHY) of the access stratum. That is, among the messages and information described later, RRC signaling may be generated by the gNB CU, while DCI may be generated by the gNB-DU. In the present embodiment, the base station of the radio communication system may be referred to as a base station device. The base station device 20 may be configured to enable radio communication with other base station device 20 and base station device 30. For example, when a plurality of base station devices 20 and 30 are eNBs or a combination of eNBs and gNBs, the devices may be connected by an X2 interface. Further or instead, when the plurality of base station devices 20 and 30 are gNBs or a combination of eNBs and gNBs, the devices may be connected by an Xn interface. Further or instead, when the plurality of base station devices 20 and 30 are a combination of the gNB central unit (CU) and the gNB distributed unit (DU), the devices may be connected by an F1 interface. The message information (RRC signalling or DCI information) described later may communicate between the plurality of base station devices 20 and 30 (for example, via the X2, Xn, and F1 interface). Note that the wireless access technology used by the base station device 20 may be the cellular communication technology or the wireless LAN technology. Of course, the wireless access technology used by the base station device 20 is not limited to these, and may be other wireless access technologies. Further, the radio communication used by the base station device 20 may be radio communication using radio waves, or radio communication (optical wireless) using infrared rays or visible light.

The base station device 30 is a radio communication device that wirelessly communicates with the terminal device 40 and the mobile device 50. The base is a device that constitutes the infrastructure in V2I communication. The base station device 30 is a kind of communication device like the base station device 20. The base station device 30 is, for example, a device corresponding to the radio base station (base station, Node B, eNB, gNB, or the like) or the radio access point. The base station device 30 may be the radio relay station. The base station device 30 may be a road base station device such as a road side unit (RSU). Further, the base station device 20 may be an optical overhanging device called a remote radio head (RRH). The base station device 30 may be configured to enable radio communication with other base station device 30 and base station device 20. Note that the radio access technology used by the base station device 30 may be the cellular communication technology or the wireless LAN technology. Of course, the wireless access technology used by the base station device 20 is not limited to these, and may be other wireless access technologies. Further, the radio communication used by the base station device 30 may be radio communication using radio waves, or radio communication (optical wireless) using infrared rays or visible light.

Note that the base station devices 20 and 30 may be able to communicate with each other via the base station device-core network interface (for example, NG interface, S1 interface, or the like). This interface may be wired or wireless. Further, the base station devices may be able to communicate with each other via an interface between base station devices (for example, Xn Interface, X2 Interface, or the like). This interface may be wired or wireless.

The base station devices 20 and 30 may be used, operated, and/or managed by various entities. For example, it is assumed that the entities may include a mobile network operator (MNO), a mobile virtual network operator (MVNO), a mobile virtual network enabler (MVNE), a neutral host network (NHN) operator, enterprises, educational institutions (school corporations, local government education committees, or the like), real estate (buildings, condominiums, or the like) managers, individuals, or the like. Of course, the entity of use, operation, and/or management of base station devices 20 and 30 is not limited thereto.

The base station devices 20 and 30 may be installed and/or operated by one operator, or may be installed and/or operated by an individual. Of course, the installation/operation entity of the base station device 20 is not limited thereto. For example, the base station devices 20 and 30 may be jointly installed and operated by a plurality of businesses or a plurality of individuals. Further, the base station devices 20 and 30 may be shared facilities used by a plurality of businesses or a plurality of individuals. In this case, the installation and/or operation of the equipment may be carried out by a third party different from the user.

The concept of the base station device (also referred to as a base station) includes not only a donor base station but also a relay base station (also referred to as a relay station or a relay station device). In addition, the concept of the base station includes not only a structure having the function of the base station but also a device installed in the structure. Structures are, for example, high-rise buildings, houses, steel towers, station facilities, airport facilities, port facilities, stadiums, and other buildings. Note that the concept of the structure includes not only buildings but also non-building structures such as tunnels, bridges, dams, walls, iron pillars, and equipment such as cranes, gates, and wind turbines. In addition, the concept of structures includes not only structures on land (above ground in a narrow sense) or underground, but also structures on water such as piers and mega floats, and structures underwater such as marine observation facilities. The base station device can be rephrased as a processing device or an information processing device.

The base station devices 20 and 30 may be fixed stations or movably configured base station devices (mobile stations). For example, the base station devices 20 and 30 may be devices installed on the mobile body or may be the mobile body itself. For example, a relay station device with mobility can be regarded as a base station device 20 and 30 as a mobile station. In addition, devices equipped with functions (at least part of the functions of the base station device) of the base station device, which are devices having originally mobility, such as vehicles, drones (aerial vehicle), and smartphones, also corresponds to the base station devices 20 and 30.

Here, the mobile body may be a mobile terminal such as smartphones or mobile phones. Further, the mobile body may be a mobile body (for example, a vehicle such as an automobile, a bicycle, a bus, a truck, a motorcycle, a train, a linear motor car, or the like) that moves on land (ground in a narrow sense), or may be a mobile body (for example, a subway) that moves underground (for example, in a tunnel). Further, the mobile body may be a mobile body (for example, a ship such as a passenger ship, a cargo ship, or a hovercraft) that moves on water, or a mobile body (for example, a submersible ship such as a submarine boat, a submarine, an unmanned submarine, or the like) that moves underwater. In addition, the mobile body may be a mobile body (for example, an aircraft such as an airplane, an airship, or a drone (aerial vehicle)) that moves in the atmosphere, or a mobile body (for example, artificial celestial bodies such as an artificial satellite, a spacecraft, a space station, and a space probe) that moves outside the atmosphere.

Further, the base station devices 20 and 30 may be ground base station devices (ground station devices) installed on the ground. For example, the base station devices 20 and 30 may be base station devices installed on a structure on a ground, or may be base station devices installed on a mobile body moving on a ground. More specifically, the base station devices 20 and 30 may be an antenna installed in a structure such as a building and a signal processing device connected to the antenna. Of course, the base station devices 20 and 30 may be structures or mobile bodies themselves. The "Ground" is not only on land (ground in a narrow sense), but also on the ground in a broad sense, including underground, water, and underwater. Note that the base station devices 20 and 30 are not limited to the ground base station devices. The base station devices 20 and 30 may be non-ground base station devices (non-ground station devices) that can float in the air or in space. For example, the base station devices 20 and 30 may be aircraft station devices or satellite station devices.

The aircraft station device is a radio communication device that can float in the atmosphere (including a stratosphere) such as an aircraft. The aircraft station device may be a device mounted on an aircraft or the like, or may be an aircraft itself. Note that the concept of the aircraft includes not only heavy aircraft such as airplanes and gliders, but also light aircraft such as balloons and airships. In addition, the concept of the aircraft includes not only heavy aircraft and light aircraft, but also rotary-wing aircraft such as helicopters and autogyros. Note that the aircraft station equipment (or the aircraft equipped with the aircraft station equipment) may be an unmanned aerial vehicle such as a drone. Note that the concept of the unmanned aerial vehicle also includes unmanned aircraft systems (UAS) and tethered UAS. In addition, the concept of the unmanned aerial vehicle includes a lighter than air UAS (LTA) and a heavier than air UAS (HTA). In addition, the concept of the unmanned aerial vehicles also includes high altitude UAS platforms (HAPs).

The satellite station device is a radio communication device that can float outside the atmosphere. The satellite station device may be a device mounted on a space mobile body such as an artificial satellite, or may be a space mobile body itself. The satellites that serve as satellite station equipment may be any one of a low earth orbiting (LEO) satellite, a medium earth orbiting (MEO) satellite, a geostationary earth orbiting (GEO) satellite, and a highly elliptical orbiting (HEO) satellite. Of course, the satellite station device may be a device mounted on the low earth orbiting satellite, the medium earth orbiting satellite, the geostationary earth orbiting satellite, and the highly elliptical orbiting satellite.

A size of coverage of base station devices 20 and 30 may be as large as a macro cell or as small as a pico cell. Of course, the size of the coverage of the base station devices 20 and 30 may be extremely small, such as a femtocell. In addition, the base station devices 20 and 30 may have beamforming capability. In this case, the base station devices 20 and 30 may have cells or service areas formed for each beam.

[Terminal Device and Mobile Device]

The terminal device 40 is a radio communication device that wirelessly communicates with the base station device 20 or the base station device 30. The terminal device 40 is, for example, a mobile phone, a smart device (smartphone or tablet), a personal digital assistant (PDA), or a personal computer. The mobile device 50 may be a machine to machine (M2M) device or an Internet of Things (IoT) device (for example, it may be called MTC UE, NB-IoT UE, and Cat.M UE). The terminal device 40 is capable of sidelink communication with the mobile device 50 and other terminal devices 40. Note that the radio communication (including sidelink communication) used by the terminal device 40 may be radio communication using radio waves or radio communication (optical wireless) using infrared rays or visible light.

The mobile device 50 is the base station device 20 or a mobile radio communication device that wirelessly communicates with the base station device 20. The mobile device 50 may be a radio communication device installed in the mobile body, or may be the mobile body itself. For example, the mobile device 50 may be a vehicle moving on the road such as an automobile, a bus, a truck, or a motorcycle, or a radio communication device mounted on the vehicle. The mobile device 50 is capable of sidelink communication with the terminal device 40 and other mobile devices 50. The mobile device 50 can use automatic retransmission technology such as HARQ when performing sidelink communication. Note that the radio communication (including sidelink communication) used by the mobile device 50 may be radio communication using radio waves or radio communication (optical wireless) using infrared rays or visible light.

Note that the "mobile device" is a type of communication device, and is also called a mobile station, a mobile station device, a terminal device, or a terminal. The concept of the "mobile device" includes not only a mobile communication device configured to be mobile, but also a mobile body in which communication devices are installed. At this time, the mobile body may be a mobile terminal, or may be a mobile body that moves on land (ground in a narrow sense), underground, on water, or underwater. Further, the mobile body may be a mobile body that moves in the atmosphere such as a drone (aerial UE) or a helicopter, or may be a mobile body that moves outside the atmosphere such as an artificial satellite.

In the present embodiment, the concept of the communication device includes not only a portable mobile device (terminal device) such as a mobile terminal, but also a device installed in a structure or a mobile body. The structure or the mobile body itself may be regarded as a communication device. In addition, the concept of the communication device includes not only a mobile device (terminal device, automobiles, or the like) but also a base station device (a donor base station, a relay base stations, or the like). The communication device is a type of processing device and information processing device.

The mobile device 50, the terminal device 40, and the base station devices 20 and 30 are connected to each other by radio communication (for example, radio wave or optical wireless). When the mobile device 50 moves from the communication area (or cell) of one base station device to the communication area (or cell) of another base station device, a handover (or handoff) or cell selection (reselection) is performed.

The mobile device 50 and the terminal device 40 may be connected to a plurality of base station devices or a plurality of cells at the same time to perform communication. For example, when one base station device can provide a plurality of cells, the mobile device 50 or the terminal device 40 can perform carrier aggregation by using one cell as a PCell and another cell as an SCell. Furthermore or instead, when a plurality of base station devices can provide one or a plurality of cells, respectively, the mobile device 50 or the terminal device 40 can execute DC by using one or a plurality of cells managed by one of the base station devices (MN (for example, MeNB or MgNB)) as PCell or PCell and SCell(s), and using one or a plurality of cells managed by the other base station device (SN (for example, SeNB or SgNB)) as PSCell or PSCell and SCell(s). Note that the DC may be referred to as multi connectivity (MC). Alternatively, by coordinated multi-point transmission and reception (CoMP) technology, the mobile device 50 and the terminal device 40 can also communicate with a plurality of base station devices via through cells (a plurality of cells having different cell identifiers or the same cell identifier) of different base station devices.

Note that the mobile device 50 and the terminal device 40 do not necessarily have to be devices that are directly used by humans. The mobile device 5 and the terminal device 40 may also be sensors installed in a factory machine or the like, such as a so-called machine type communication (MTC). Further, the mobile device 50 may be a machine to machine (M2M) device or an Internet of Things (IoT) device. Further, the mobile device 50 and the terminal device 40 may be devices having a relay communication function, as represented by device to device (D2D) and vehicle to everything (V2X). Further, the mobile device 50 and the terminal device 40 may be devices called client premises equipment (CPE) used in a wireless backhaul or the like.

Hereinafter, the configuration of each device constituting the information processing system 1 according to the present embodiment will be specifically described.

2-2. Configuration of Management Device

The management device 10 is a device that manages a wireless network. For example, the management device 10 is a device that manages the communication of the base station devices 20 and 30. When the core network CN is 5GC, the management device 10 may be a device having a function as, for example, AMF, SMF, UPF, or the like. The management device 10 has an application processing execution function (for example, an edge function), and may function as a server device such as an application server. More specifically, when the UPF is located on a local area network (that is, when the UPF is a local UPF), then a device for edge computing may be disposed in a DN that has an N6 reference point between the DN and the UPF. Then, the device for edge computing may be included in the management device 10. The device for edge computing may operate as for example, multi access edge computing (MEC) platform, MEC host, MEC application.

Figure 17:
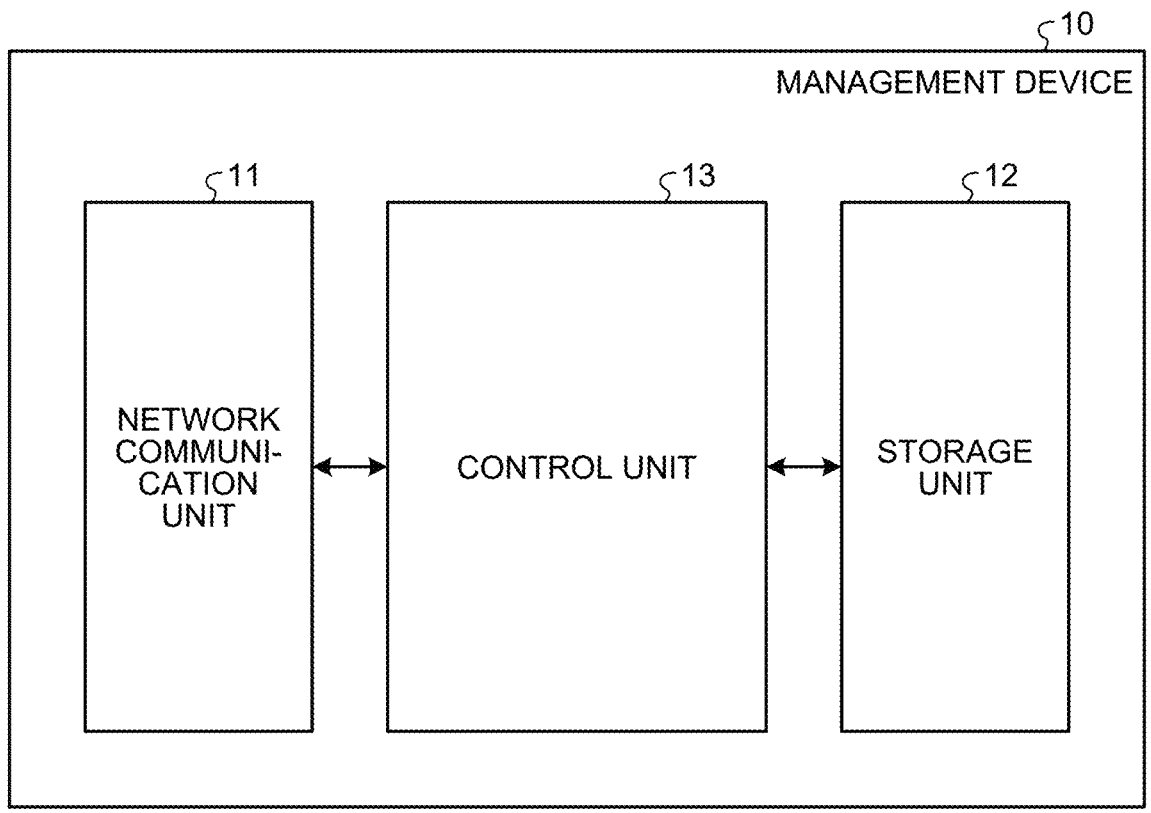
FIG. 17 is a diagram illustrating a configuration example of a management device according to an embodiment of the present disclosure.

FIG. 17 is a diagram illustrating a configuration example of the management device 10 according to an embodiment of the present disclosure. The management device 10 includes a network communication unit 11, a storage unit 12, and a control unit 13. Note that the configuration illustrated in FIG. 17 is a functional configuration, and the hardware configuration may be different therefrom. Further, the functions of the management device 10 may be distributed and mounted in a plurality of physically separated configurations. For example, the management device 10 may be constituted by a plurality of server devices.

The network communication unit 11 is a communication interface for communicating with other devices. The network communication unit 11 may be a network interface or a device connection interface. The network communication unit 11 has a function of directly or indirectly connecting to the network N1. For example, the network communication unit 11 may include a local area network (LAN) interface such as a network interface card (NIC), or may include a universal serial bus (USB) interface constituted by a USB host controller, a USB port, and the like. Further, the network communication unit 11 may be a wired interface or a wireless interface. The network communication unit 11 functions as a communication means of the management device 10. The network communication unit 11 communicates with the base station devices 20 and 30 under the control of the control unit 13.

The storage unit 12 is a data readable/writable storage device such as a dynamic random access memory (DRAM), a static random access memory (SRAM), a flash memory, and a hard disk. The storage unit 12 functions as a storage means for the management device 10. The storage unit 12 stores, for example, the connection state of the mobile device 50. For example, the storage unit 12 stores a radio resource control (RRC) state or an EPS connection management (ECM) state of the mobile device 50. The storage unit 12 may function as a home memory for storing the location information of the mobile device 50.

The control unit 13 is a controller that controls each unit of the management device 10. The control unit 13 is realized by a processor such as a central processing unit (CPU) or a micro processing unit (MPU). For example, the control unit 13 may be realized by a random access memory (RAM) or the like by allowing a processor to execute various programs stored in the storage device inside the management device 10 as a work area. Note that the control unit 13 may be realized by an integrated circuit such as an application specific integrated circuit (ASIC) or a field programmable gate array (FPGA). A CPU, a MPU, an ASIC, and an FPGA can all be considered as controllers

2-3. Configuration of Base Station Device (Network)

Next, the configuration of the base station device 20 will be described. The base station device 20 is a radio communication device that wirelessly communicates with the mobile device 50. The base station device 20 is a device that functions as, for example, a radio base station, a radio relay station, a radio access point, or the like. At this time, the base station device 20 may be an optical overhanging device such as RRH. As described above, the base station device 20 is a device that constitutes a network in V2N communication.

Figure 18A:
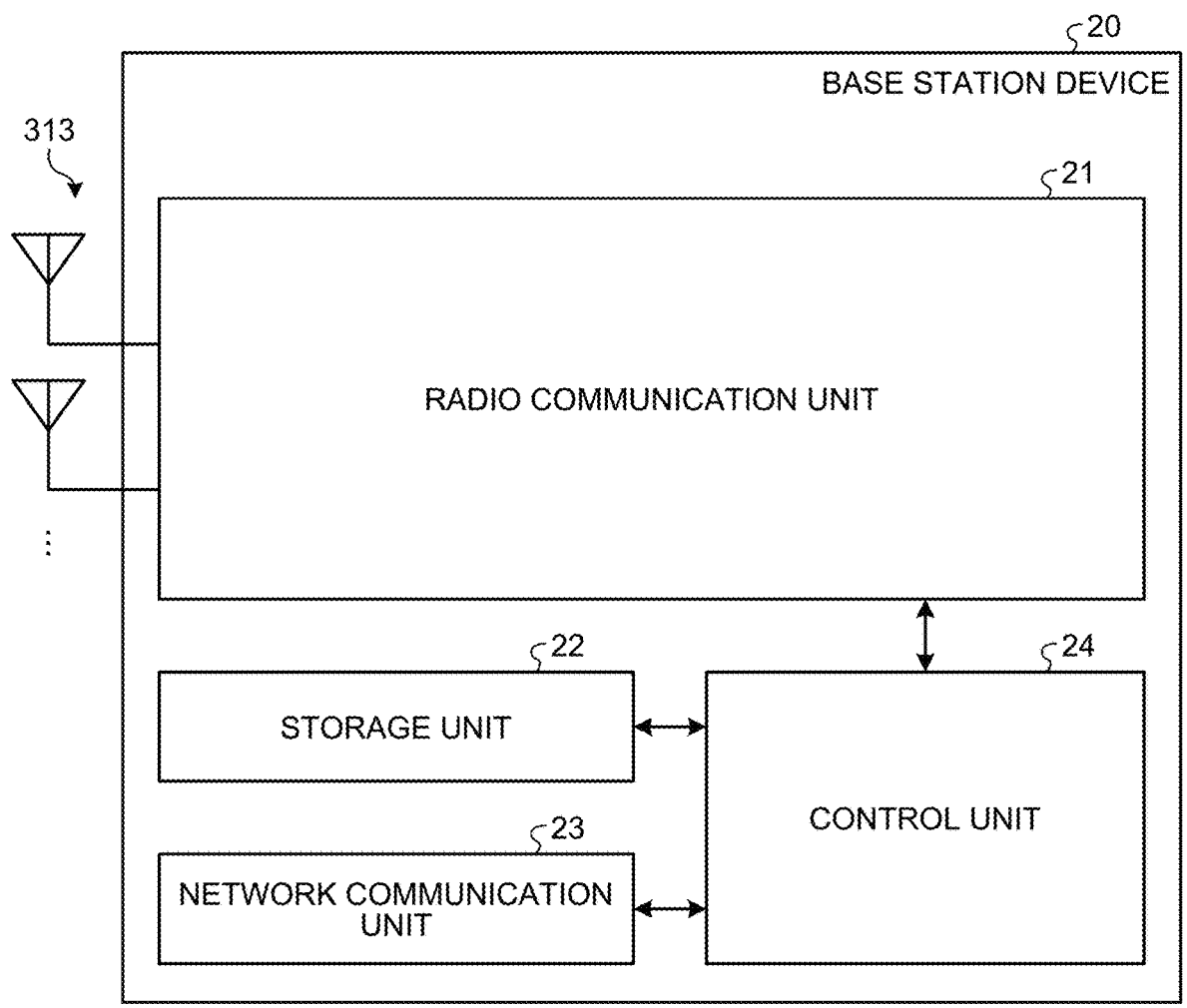
FIG. 18A is a diagram illustrating a configuration example of a base station device according to an embodiment of the present disclosure.
Figure 18B:
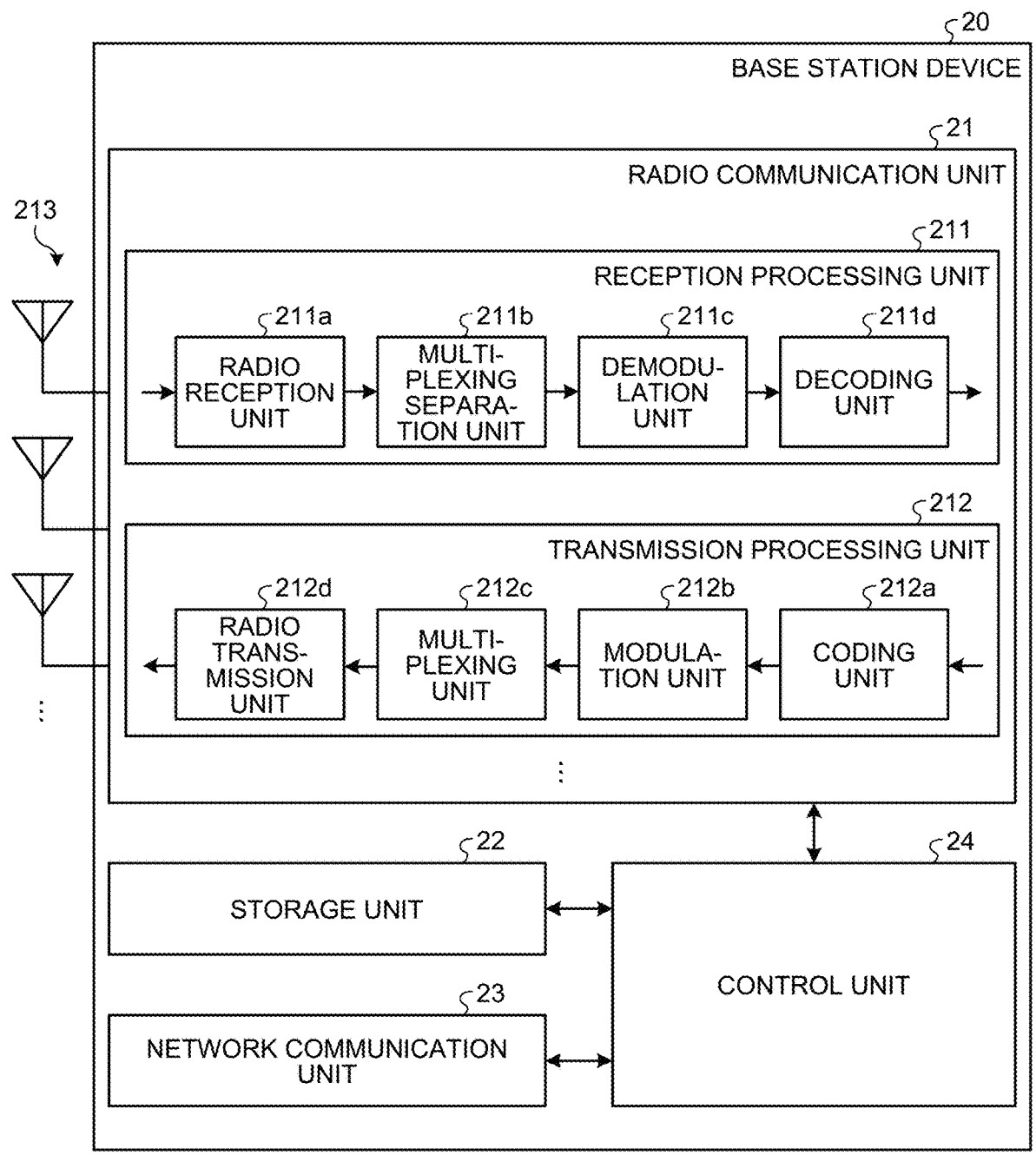
FIG. 18B is a diagram illustrating a configuration example of the base station device according to the embodiment of the present disclosure.

FIGS. 18A and 18B are diagrams illustrating a configuration example of the base station device 20 according to the embodiment of the present disclosure. As illustrated in FIG. 18A, the base station device 20 includes a radio communication unit 21, a storage unit 22, a network communication unit 23, and a control unit 24. Note that the configuration illustrated in FIG. 18A is a functional configuration, and the hardware configuration may be different therefrom. Further, the functions of the base station device 20 may be distributed and mounted in a plurality of physically separated configurations. The detailed configuration of the base station device 20 illustrated in FIG. 18A is illustrated in FIG. 18B.

The radio communication unit 21 is a radio communication interface that wirelessly communicates with other radio communication devices (for example, mobile device 50, base station device 30, other base station device 20). The radio communication unit 21 operates according to the control of the control unit 24. Note that the radio communication unit 21 may support a plurality of radio access methods. For example, the radio communication unit 21 may support both the NR and the LTE. The radio communication unit 21 may support W-CDMA and cdma2000 in addition to LTE. Of course, the radio communication unit 21 may support radio access methods other than NR, LTE, W-CDMA, or cdma2000.

The radio communication unit 21 includes a reception processing unit 211, a transmission processing unit 212, and an antenna 213. The radio communication unit 21 may include a plurality of reception processing units 211, transmission processing units 212, and antennas 213. When the radio communication unit 21 corresponds to the plurality of radio access methods, each part of the radio communication unit 21 can be individually configured for each radio access method. For example, the reception processing unit 211 and the transmission processing unit 212 may be individually constituted by the LTE and the NR.

The reception processing unit 211 processes the uplink signal received via the antenna 213. The reception processing unit 211 includes a radio reception unit 211a, a multiplexing separation unit 211b, a demodulation unit 211c, and a decoding unit 211d.

The radio reception unit 211a performs down-conversion, removal of unnecessary frequency components, controls the amplification level, orthogonal demodulation, conversion to a digital signal, removal of a guard interval, extraction of a frequency domain signal by fast Fourier transform, or the like, on the uplink signal. The multiplexing separation unit 211b separates uplink channels such as a physical uplink shared channel (PUSCH) and a physical uplink control channel (PUCCH) and an uplink reference signal from a signal output from the radio reception unit 211a. The demodulation unit 211c demodulates the received signal for the modulation symbol of the uplink channel using a modulation method such as binary phase shift keying (BPSK) or quadrature phase shift keying (QPSK). The modulation method used by the demodulation unit 211c may be 16 quadrature amplitude modulation (QAM), 64 QAM, or 256 QAM. The decoding unit 211d performs decoding processing on coded bits of the demodulated uplink channel. The decoded uplink data and uplink control information are output to the control unit 24.

The transmission processing unit 212 performs downlink control information and downlink data transmission processing. The transmission processing unit 212 includes a coding unit 212a, a modulation unit 212b, a multiplexing unit 212c, and a radio transmission unit 212d.

The coding unit 212a codes the downlink control information and the downlink data input from the control unit 24 by using an encoding method such as block coding, convolutional coding, or turbo coding. In the case of the NR, the coding unit 212a may be coded by polar coding or coded by low density parity check (LDPC) coding. The modulation unit 212b modulates coding bits output from the coding unit 212a by a predetermined modulation method such as BPSK, QPSK, 16QAM, 64QAM, or 256QAM. The multiplexing unit 212c multiplexes the modulation symbol of each channel and the downlink reference signal and arranges the multiplexed modulation symbols and downlink reference signal in a predetermined resource element. The radio transmission unit 212d performs various signal processing on the signal from the multiplexing unit 212c. For example, the radio transmission unit 212d performs processing such as conversion into a time domain by fast Fourier transform, addition of a guard interval, generation of a baseband digital signal, conversion into an analog signal, orthogonal modulation, up-conversion, removal of extra frequency components, and power amplification. The signal generated by the transmission processing unit 212 is transmitted from the antenna 213.

The storage unit 22 is a storage device that can read and write data such as a DRAM, an SRAM, a flash memory, and a hard disk. The storage unit 22 functions as a storage means for the base station device 20.

The network communication unit 23 is a communication interface for communicating with other devices (for example, management device 10, other base station device 20, base station device 30, cloud server device CS, or the like). The network communication unit 23 has a function of directly or indirectly connecting to the network N1. For example, the network communication unit 23 includes a LAN interface such as NIC. Further, the network communication unit 23 may be a wired interface or a wireless interface. The network communication unit 23 functions as a network communication means of the base station device 20. The network communication unit 23 communicates with other devices (for example, management device 10, cloud server device CS, etc.) under the control of the control unit 24. The configuration of the network communication unit 23 may be the same as that of the network communication unit 11 of the management device 10.

The control unit 24 is a controller that controls each unit of the base station device 20. The control unit 24 is realized by a processor (hardware processor) such as a central processing unit (CPU) or a micro processing unit (MPU). For example, the control unit 24 may be realized by a random access memory (RAM) or the like by allowing a processor to execute various programs stored in the storage device inside the base station device 20 as a work area. Note that the control unit 24 may be realized by an integrated circuit such as an application specific integrated circuit (ASIC) or a field programmable gate array (FPGA). A CPU, a MPU, an ASIC, and an FPGA can all be considered as controllers The control unit 24 may be configured by being divided into a plurality of functional blocks indicating each function of the control unit 24. The functional block of the control unit 24 may be a software block or a hardware block. For example, each of the above-described functional blocks may be one software module realized by software (including microprograms) or one circuit block on a semiconductor chip (die). Of course, each functional block may be one processor or one integrated circuit. The method of configuring the functional block is arbitrary. Note that the operation of the control unit 24 will be described in detail later.

2-4. Configuration of Base Station Device (Infrastructure)

Next, the configuration of the base station device 30 will be described. The base station device 30 is a wireless communication device that wirelessly communicates with the mobile device 50. The base station device 30 is a device that functions as, for example, a radio base station, a radio relay station, a radio access point, or the like. At this time, the base station device 30 may be a road base station device such as an RSU, or an optical overhanging device such as an RRH. As described above, the base station device 30 is a device that constitutes the infrastructure in V2I communication.

Figure 19:
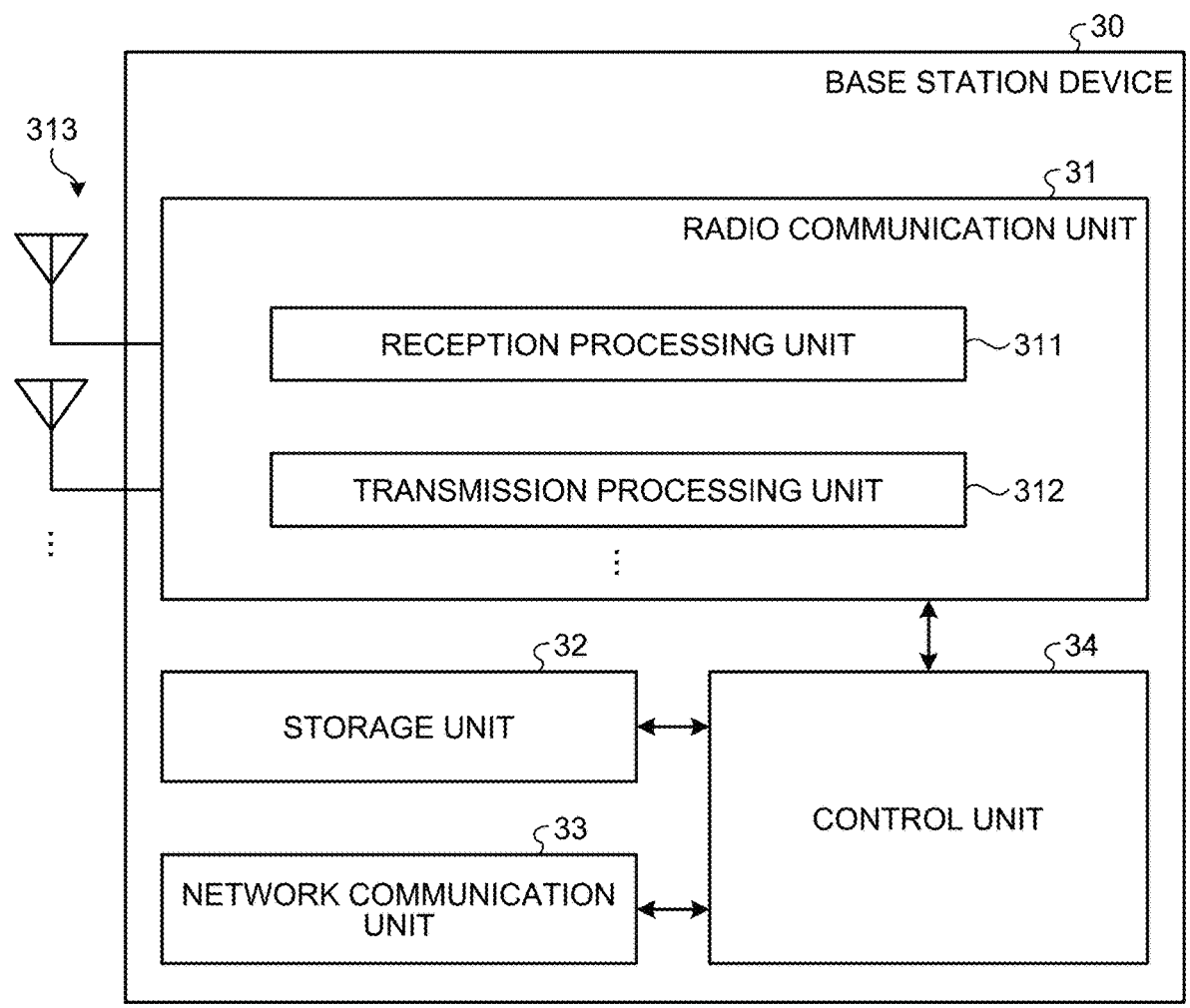
FIG. 19 is a diagram illustrating a configuration example of the base station device according to the embodiment of the present disclosure.

FIG. 19 is a diagram illustrating a configuration example of the base station device 30 according to the embodiment of the present disclosure. The base station device 30 includes a radio communication unit 31, a storage unit 32, a network communication unit 33, and a control unit 34. Note that the configuration illustrated in FIG. 19 is a functional configuration, and the hardware configuration may be different therefrom. Further, the functions of the base station device 30 may be distributed and mounted in a plurality of physically separated configurations.

The radio communication unit 31 is a radio communication interface that wirelessly communicates with other radio communication devices (for example, mobile device 50, base station device 20, other base station device 30). The radio communication unit 31 operates according to the control of the control unit 34. The radio communication unit 31 includes a reception processing unit 311, a transmission processing unit 312, and an antenna 313. The configuration of the radio communication unit 31 (reception processing unit 311, transmission processing unit 312, and antenna 313) is the same as that of the radio communication unit 21 (reception processing unit 211, transmission processing unit 212, and antenna 213) of the base station device 20.

The storage unit 32 is a storage device that can read and write data such as DRAM, SRAM, a flash memory, and a hard disk. The storage unit 32 functions as a storage means for the base station device 30. The configuration of the storage unit 32 is the same as that of the storage unit 22 of the base station device 20.

The network communication unit 33 is a communication interface for communicating with other devices (for example, management device 10, other base station device 20, base station device 30, cloud server device CS, or the like). The network communication unit 33 has a function of directly or indirectly connecting to the network N1. For example, the network communication unit 33 includes a LAN interface such as NIC. Further, the network communication unit 33 may be a wired interface or a wireless interface. The network communication unit 33 functions as a network communication means of the base station device 30. The configuration of the network communication unit 33 is the same as that of the network communication unit 23 of the base station device 20.

The control unit 34 is a controller that controls each unit of the base station device 30. The control unit 34 is realized by a processor such as a CPU or an MPU. For example, the control unit 34 may be realized by a RAM or the like by allowing a processor to execute various programs stored in the storage device inside the base station device 30 as a work area. Note that the control unit 34 may be realized by an integrated circuit such as an ASIC or an FPGA. A CPU, a MPU, an ASIC, and an FPGA can all be considered as controllers The control unit 34 may be configured by being divided into a plurality of functional blocks indicating each function of the control unit 34. The functional block of the control unit 34 may be a software block or a hardware block. For example, each of the above-described functional blocks may be one software module realized by software (including microprograms) or one circuit block on a semiconductor chip (die). Of course, each functional block may be one processor or one integrated circuit. The method of configuring the functional block is arbitrary. Note that the operation of the control unit 34 will be described in detail later. Further, the operation of the control unit 34 may be the same as the operation of the control unit 24 described above.

2-5. Configuration of Terminal Device

Next, the configuration of the terminal device 40 will be described. The terminal device 40 is a mobile radio communication device. For example, the terminal device 40 may be a user terminal (UE: user equipment) such as a mobile phone or a smart device. The terminal device 40 can wirelessly communicate with the base station device 20 or the base station device 30. In addition, the terminal device 40 is capable of sidelink communication with the mobile device 50 and other terminal devices 40.

Figure 20:
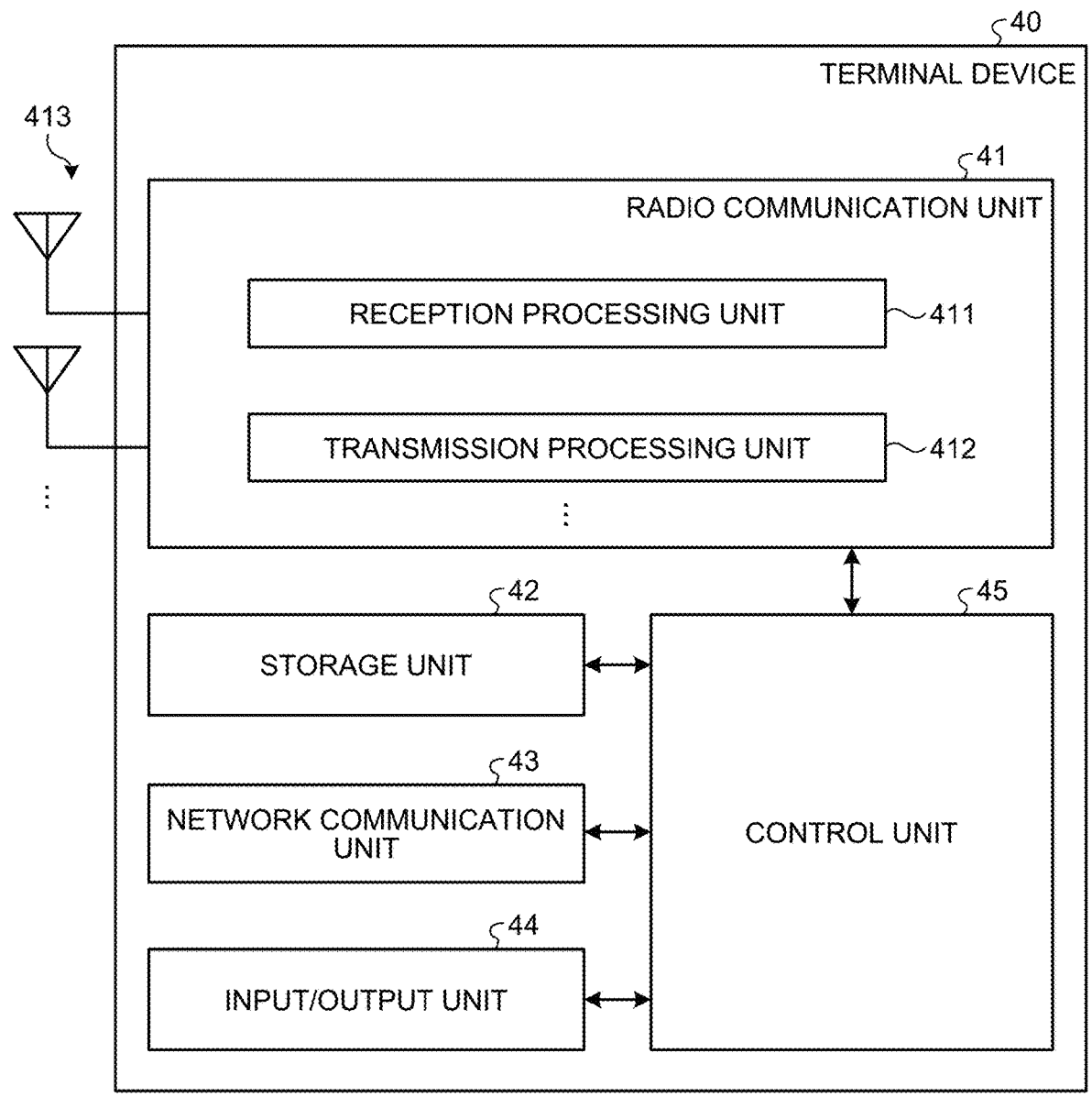
FIG. 20 is a diagram illustrating a configuration example of a terminal device according to an embodiment of the present disclosure.

FIG. 20 is a diagram illustrating a configuration example of the terminal device 40 according to an embodiment of the present disclosure. The terminal device 40 includes a radio communication unit 41, a storage unit 42, a network communication unit 43, an input/output unit 44, and a control unit 45. Note that the configuration illustrated in FIG. 20 is a functional configuration, and the hardware configuration may be different therefrom. Further, the functions of the terminal device 40 may be distributed and mounted in a plurality of physically separated configurations. Further, in the configuration of the terminal device 40, a network communication unit 53 and the input/output unit 44 do not have to be indispensable components.

The radio communication unit 41 is a radio communication interface that wirelessly communicates with other radio communication devices (for example, base station device 20, and base station device 30). The radio communication unit 41 operates according to the control of the control unit 45. The radio communication unit 41 corresponds to one or a plurality of radio access methods. For example, the radio communication unit 41 supports both the NR and the LTE. The radio communication unit 41 may support W-CDMA or cdma2000 in addition to the NR and the LTE. In addition, the radio communication unit 21 may support communication using NOMA.

The radio communication unit 41 includes a reception processing unit 411, a transmission processing unit 412, and an antenna 413. The radio communication unit 41 may include a plurality of reception processing units 411, transmission processing units 412, and antennas 413. When the radio communication unit 41 corresponds to the plurality of radio access methods, each part of the radio communication unit 41 can be individually configured for each radio access method. For example, the reception processing unit 411 and the transmission processing unit 412 may be individually constituted by the LTE and the NR.

The reception processing unit 411 processes the downlink signal received via the antenna 413. The reception processing unit 411 includes a radio reception unit 411*a*, a multiplexing separation unit 411*b*, a demodulation unit 411*c*, and a decoding unit 411*d*.

The radio reception unit 411*a* performs down-conversion, removal of unnecessary frequency components, controls the amplification level, orthogonal demodulation, conversion to a digital signal, removal of a guard interval, extraction of a frequency domain signal by fast Fourier transform, or the like, on the downlink signal. The multiplexing separation unit 411*b* separates the downlink channel, the downlink synchronization signal, and the downlink reference signal from the signal output from the radio reception unit 411*a*. The downlink channel is, for example, a channel such as a physical broadcast channel (PBCH), a physical downlink shared channel (PDSCH), and a physical downlink control channel (PDCCH). The demodulation unit 211*c* demodulates the received signal for the downlink channel modulation symbol using a modulation method such as BPSK, QPSK, 16QAM, 64QAM, or 256QAM. The decoding unit 411*d* performs decoding processing on coded bits of the demodulated downlink channel. The decoded downlink data and downlink control information are output to the control unit 45. The downlink synchronization signal may include an SSB (SS/PBCH Block). The downlink reference signal may include CSI-RS and DMRS.

The transmission processing unit 412 performs uplink control information and uplink data transmission processing. The transmission processing unit 412 includes a coding unit 412*a*, a modulation unit 412*b*, a multiplexing unit 412*c*, and a radio transmission unit 412*d*.

The coding unit 412*a* codes the uplink control information and the uplink data input from the control unit 45 by using a coding method such as block coding, convolutional coding, or turbo coding. Note that in the case of the NR, the coding unit 412*a* may be coded by polar coding or coded by low density parity check (LDPC) coding. The modulation unit 412*b* modulates coding bits output from the coding unit 412*a* by a predetermined modulation method such as BPSK, QPSK, 16QAM, 64QAM, or 256QAM. The multiplexing unit 412*c* multiplexes the modulation symbol of each channel and the uplink reference signal and arranges the multiplexed modulation symbols and downlink reference signal in a predetermined resource element. The radio transmission unit 412*d* performs various signal processing on the signal from the multiplexing unit 412*c*. For example, the radio transmission unit 412*d* performs processing such as conversion into a time domain by inverse fast Fourier transform, addition of a guard interval, generation of a baseband digital signal, conversion into an analog signal, orthogonal modulation, up-conversion, removal of extra frequency components, and power amplification. The signal generated by the transmission processing unit 412 is transmitted from the antenna 413.

The storage unit 42 is a storage device that can read and write data such as a DRAM, an SRAM, a flash memory, and a hard disk. The storage unit 42 functions as a storage means for the terminal device 40.

The network communication unit 43 is a communication interface for communicating with other devices. For example, the network communication unit 43 is a LAN interface such as NIC. The network communication unit 43 has a function of directly or indirectly connecting to the network N1. The network communication unit 43 may be a wired interface or a wireless interface. The network communication unit 43 functions as a network communication means of the terminal device 40. The network communication unit 43 communicates with other devices under the control of the control unit 45.

The input/output unit 44 is a user interface for exchanging information with a user. For example, the input/output unit 44 is an operation device for a user to perform various operations such as a keyboard, a mouse, an operation key, and a touch panel. Alternatively, the input/output unit 44 is a display device such as a liquid crystal display or an organic electroluminescence display (organic EL display). The input/output unit 44 may be an audio device such as a speaker or a buzzer. Further, the input/output unit 44 may be a lighting device such as a light emitting diode (LED) lamp. The input/output unit 44 functions as an input/output means (input means, output means, operating means or notification means) of the terminal device 40.

The control unit 45 is a controller that controls each unit of the terminal device 40. The control unit 45 is realized by a processor such as a CPU or an MPU. For example, the control unit 45 may be realized by a RAM or the like by allowing a processor to execute various programs stored in the storage device inside the terminal device 40 as a work area. Note that the control unit 45 may be realized by an integrated circuit such as an ASIC or an FPGA. A CPU, a MPU, an ASIC, and an FPGA can all be considered as controllers The control unit 45 may be configured by being divided into a plurality of functional blocks indicating each function of the control unit 45. The functional block of the control unit 45 may be a software block or a hardware block. For example, each of the above-described functional blocks may be one software module realized by software (including microprograms) or one circuit block on a semiconductor chip (die). Of course, each functional block may be one processor or one integrated circuit. The method of configuring the functional block is arbitrary. Note that the operation of the control unit 45 will be described in detail later.

2-6. Configuration of Mobile Device

Next, the configuration of the mobile device 50 will be described. The mobile device 50 is a mobile radio communication device. For example, the mobile device 50 is a vehicle such as an automobile, or a radio communication device mounted on the vehicle. The mobile device 50 may be a mobile terminal device such as a mobile phone or a smart device. The mobile device 50 can wirelessly communicate with the base station device 20 or the base station device 30. In addition, the mobile device 50 is capable of sidelink communication with the terminal device 40 and other mobile devices 50.

Figure 21:
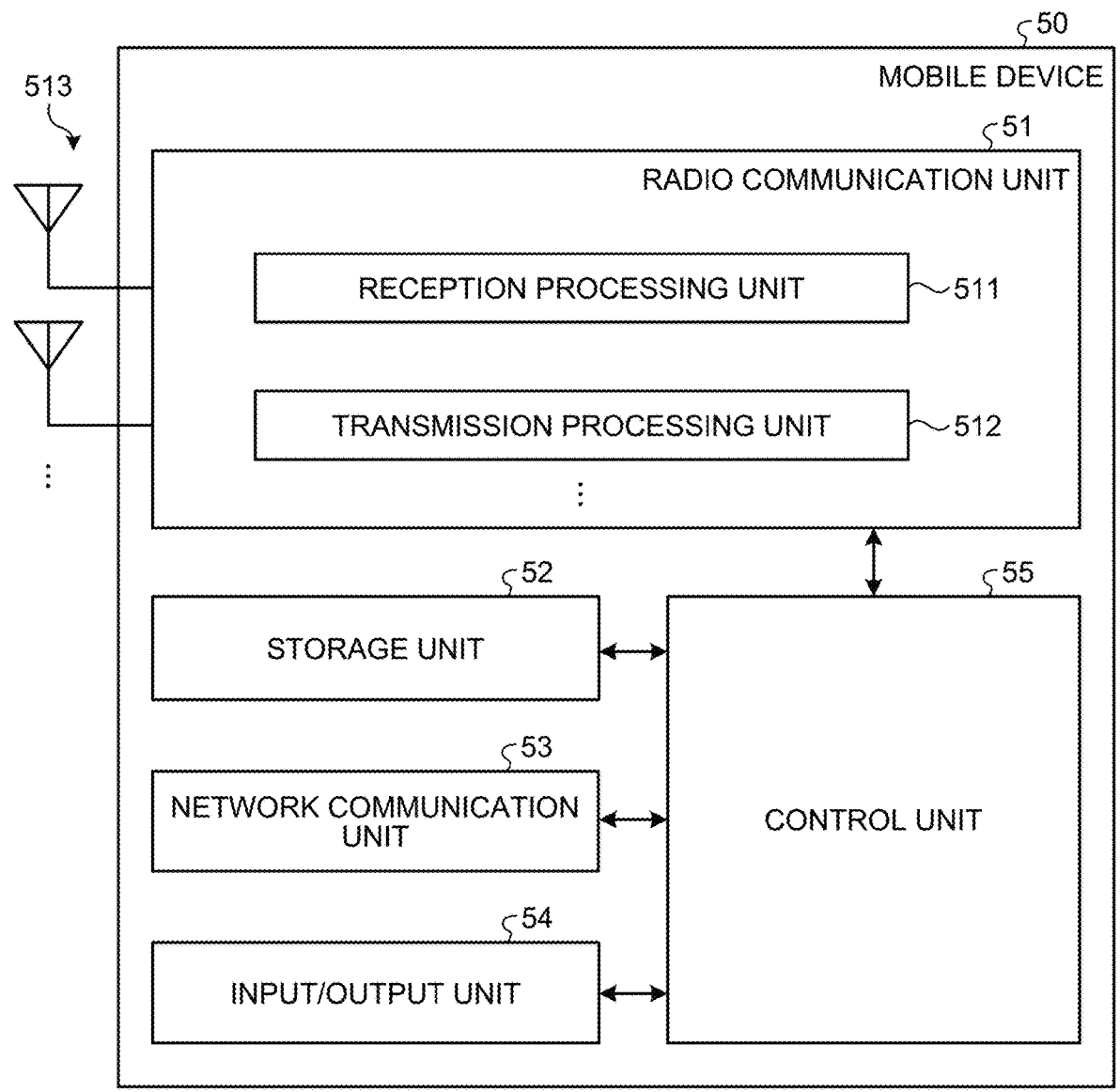
FIG. 21 is a diagram illustrating a configuration example of a mobile device according to an embodiment of the present disclosure.

FIG. 21 is a diagram illustrating a configuration example of the mobile device 50 according to an embodiment of the present disclosure. The mobile device 50 includes a radio communication unit 51, a storage unit 52, a network communication unit 53, an input/output unit 54, and a control unit 55. Note that the configuration illustrated in FIG. 21 is a functional configuration, and the hardware configuration may be different therefrom. Further, the functions of the mobile device 50 may be distributed and mounted in a plurality of physically separated configurations.

The radio communication unit 51 is a radio communication interface that wirelessly communicates with other radio communication devices (for example, base station device 20, and base station device 30). The radio communication unit 51 operates according to the control of the control unit 55. The radio communication unit 51 corresponds to one or a plurality of radio access methods. For example, the radio communication unit 51 may support both the NR and the LTE. The radio communication unit 51 may support W-CDMA or cdma2000 in addition to the LTE. In addition, the radio communication unit 21 supports communication using NOMA.

The radio communication unit 51 includes a reception processing unit 511, a transmission processing unit 512, and an antenna 513. The radio communication unit 51 may include a plurality of reception processing units 511, transmission processing units 512, and antennas 513. When the radio communication unit 51 corresponds to the plurality of radio access methods, each part of the radio communication unit 51 can be individually configured for each radio access method. For example, the reception processing unit 511 and the transmission processing unit 512 may be individually constituted by the LTE and the NR.

The reception processing unit 511 processes the downlink signal received via the antenna 513. The reception processing unit 511 includes a radio reception unit 511a, a multiplexing separation unit 511b, a demodulation unit 511c, and a decoding unit 511d.

The radio reception unit 511a performs down-conversion, removal of unnecessary frequency components, controls the amplification level, orthogonal demodulation, conversion to a digital signal, removal of a guard interval, extraction of a frequency domain signal by fast Fourier transform, or the like, on the downlink signal. The multiplexing separation unit 511b separates the downlink channel, the downlink synchronization signal, and the downlink reference signal from the signal output from the radio reception unit 511a. The downlink channel is, for example, a channel such as PBCH, PDSCH, or PDCCH. The demodulation unit 211c demodulates the received signal for the downlink channel modulation symbol using a modulation method such as BPSK, QPSK, 16QAM, 64QAM, or 256QAM. The decoding unit 511d performs decoding processing on coded bits of the demodulated downlink channel. The decoded downlink data and downlink control information are output to the control unit 55.

The transmission processing unit 512 performs uplink control information and uplink data transmission processing. The transmission processing unit 512 includes a coding unit 512a, a modulation unit 512b, a multiplexing unit 512c, and a radio transmission unit 512d.

The coding unit 512a codes the uplink control information and the uplink data input from the control unit 55 by using a coding method such as block coding, convolutional coding, or turbo coding. The modulation unit 512b modulates coding bits output from the coding unit 512a by a predetermined modulation method such as BPSK, QPSK, 16QAM, 64QAM, or 256QAM. The multiplexing unit 512c multiplexes the modulation symbol of each channel and the uplink reference signal and arranges the multiplexed modulation symbols and downlink reference signal in a predetermined resource element. The radio transmission unit 512d performs various signal processing on the signal from the multiplexing unit 512c. For example, the radio transmission unit 512d performs processing such as conversion into a time domain by inverse fast Fourier transform, addition of a guard interval, generation of a baseband digital signal, conversion into an analog signal, orthogonal modulation, up-conversion, removal of extra frequency components, and power amplification. The signal generated by the transmission processing unit 512 is transmitted from the antenna 513.

The storage unit 52 is a storage device that can read and write data such as a DRAM, an SRAM, a flash memory, and a hard disk. The storage unit 52 functions as a storage means for the mobile device 50.

The network communication unit 53 is a communication interface for communicating with other devices. For example, the network communication unit 53 is a LAN interface such as NIC. The network communication unit 53 has a function of directly or indirectly connecting to the network N1. The network communication unit 53 may be a wired interface or a wireless interface. The network communication unit 53 functions as a network communication means of the mobile device 50. The network communication unit 53 communicates with other devices under the control of the control unit 55. In the configuration of the terminal device 40, the network communication unit 53 does not have to be an indispensable component.

The input/output unit 54 is a user interface for exchanging information with a user. For example, the input/output unit 54 is an operation device for a user to perform various operations such as a keyboard, a mouse, an operation key, and a touch panel. Alternatively, the input/output unit 54 is a display device such as a liquid crystal display or an organic EL display. The input/output unit 54 may be an audio device such as a speaker or a buzzer. Further, the input/output unit 54 may be a lighting device such as an LED lamp. The input/output unit 54 functions as an input/output means (input means, output means, operating means or notification means) of the mobile device 50. Note that the input/output unit 54 does not have to be an indispensable component in the configuration of the terminal device 40.

The control unit 55 is a controller that controls each unit of the mobile device 50. The control unit 55 is realized by a processor (hardware processor) such as a CPU or an MPU. For example, the control unit 55 may be realized by a RAM or the like by allowing a processor to execute various programs stored in the storage device inside the mobile device 50 as a work area. Note that the control unit 55 may be realized by an integrated circuit such as an ASIC or an FPGA. A CPU, a MPU, an ASIC, and an FPGA can all be considered as controllers The control unit 55 may be configured by being divided into a plurality of functional blocks indicating each function of the control unit 24. The functional block of the control unit 55 may be a software block or a hardware block. For example, each of the above-described functional blocks may be one software module realized by software (including microprograms) or one circuit block on a semiconductor chip (die). Of course, each functional block may be one processor or one integrated circuit. The method of configuring the functional block is arbitrary. Note that the operation of the control unit 55 will be described in detail later.

Note that the mobile device 50 may have a mobile function. For example, the mobile device 50 may have a power unit such as an engine and may move by its own power. Note that the mobile device 50 does not necessarily have a mobile function. In this case, the mobile device 50 may be a device that is additionally attached to a device (for example, a vehicle such as an automobile) having a mobile function. For example, the mobile device 50 may be a navigation system device additionally attached to the automobile.

3. OPERATION OF INFORMATION PROCESSING SYSTEM

Next, an operation example of an information processing system according to an embodiment will be described. Note that the "base station" shown below is a base station including the base station device 20 or the base station device 30 described above. In addition, the "terminal device" shown below is the terminal device 40 or the mobile device 50 described above. That is, the operation of the base station shown below is the operation of the control unit 24 included in the base station device 20 or the operation of the control unit 34 included in the base station device 30. In addition, the operation of the terminal device shown below is the operation of the control unit 45 included in the terminal device 40 or the operation of the control unit 55 included in the mobile device 50.

In the present embodiment, the following (1) to (3) are newly constructed so that the terminal device can perform the sidelink communication using the slot format of the NR. Details of these (1) to (3) will be described in order.
(1) New design of slot format
(2) Method of configuring slot format
(3) Method of changing slot format (override symbol)

3-1. (1) New Design of Slot Format

In the present embodiment, in the NR V2X communication, the base station newly designs a slot format for performing sidelink communication. Specifically, the base station newly designs the slot format according to the methods shown in (1A) and (1B) below.
(1A) Method of defining new symbol for sidelink communication
(1B) Method of using existing symbol for sidelink communication

[1A: Method of Defining New Symbol for Sidelink Communication]

The base station can configure four states by defining a new symbol for sidelink communication: uplink communication symbol (uplink symbol), downlink communication symbol (downlink symbol), flexible symbol (flexible symbol), and sidelink communication symbol (sidelink symbol) as the state of each symbol in the slot format. When configuring a new symbol for sidelink communication, it can be configured in the following three methods.
(1A-1) Symbol that can only be used for sidelink communication
(1A-2) Symbol that can selectively perform sidelink communication or uplink communication
(1A-3) Symbol that can simultaneously perform sidelink communication and uplink communication

[1A-1: Symbol that can Only be Used for Sidelink Communication]

Figure 22:
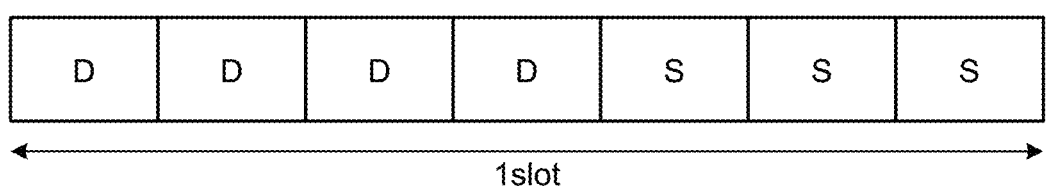
FIG. 22 is a diagram illustrating an example of a slot format including a symbol for performing sidelink communication.

First, a method of newly defining a symbol that can only be used for sidelink communication will be described. FIG. 22 is a diagram illustrating an example of a slot format including a symbol for performing sidelink communication. In the slot format illustrated in FIG. 22, first to fourth symbols are downlink symbols (D), and fifth to seventh symbols are sidelink symbols (S). When the slot format illustrated in FIG. 22 is used, the terminal device performs the downlink communication with the first to fourth symbols in the slot and the sidelink communication with the fifth to seventh symbols. That is, in the case of the slot format illustrated in FIG. 22, in the fifth to seventh symbols, only the sidelink communication can be performed, and the downlink communication and the uplink communication cannot be performed.

[1A-2: Symbol that can Selectively Perform Sidelink Communication or Uplink Communication]

Figure 23:
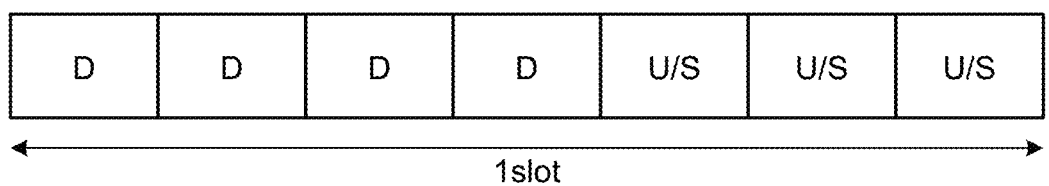
FIG. 23 is a diagram illustrating an example of the slot format including the symbol for performing the sidelink communication.

Second, a method of defining a symbol capable of selectively performing sidelink communication or uplink communication will be described. FIG. 23 is a diagram illustrating an example of a slot format including a symbol for performing sidelink communication. In the slot format illustrated in FIG. 23, first to fourth symbols are downlink symbols (D), and fifth to seventh symbols are uplink symbols (U) or sidelink symbols (S). When the slot format illustrated in FIG. 23 is used, the terminal device performs downlink communication with the first to fourth symbols in the slot and the uplink communication or the sidelink communication with the fifth to seventh symbols. That is, in the case of the slot format illustrated in FIG. 23, for the fifth to seventh symbols, it is possible to select whether to use each symbol for the uplink communication or the sidelink communication. Note that the selection of whether to use for the uplink communication or the sidelink communication may be specified by the base station, or may be chosen by the determination of the terminal device. Note that the fifth to seventh symbols illustrated in FIG. 23 cannot be used for the downlink communication.

[1A-3: Symbol that can Simultaneously Perform Sidelink Communication and Uplink Communication]

Figure 24:
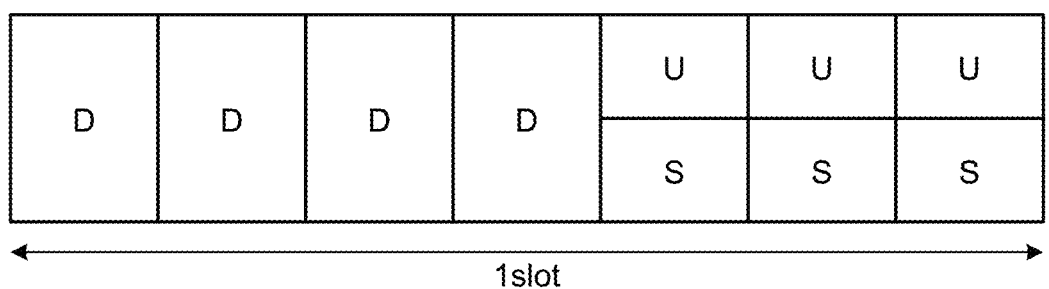
FIG. 24 is a diagram illustrating an example of the slot format including the symbol for performing the sidelink communication.

Third, a method of defining a symbol capable of simultaneously performing sidelink communication or uplink communication will be described. FIG. 24 is a diagram illustrating an example of a slot format including a symbol for performing sidelink communication. In the slot format illustrated in FIG. 24, first to fourth symbols are downlink symbols (D), and fifth to seventh symbols are uplink symbols (U) and sidelink symbols (S). When the slot format illustrated in FIG. 24 is used, the terminal device performs the downlink communication with the first to fourth symbols in the slot and simultaneously performs the uplink communication or the sidelink communication with the fifth to seventh symbols. In the fifth to seventh symbols, the uplink communication and the sidelink communication may be configure to different resource elements (that is, different subcarriers) or may be configured to the same resource element. When the uplink communication and the sidelink communication are configured in the same resource element, for example, code multiplexing (code division multiple access (CDMA) and interleave division multiple access (IDMA)) or spatial multiplexing may be performed. Note that the fifth to seventh symbols illustrated in FIG. 24 cannot be used for the downlink communication.

Note that the slot formats described in (1A-1) to (1A-3) are examples. For example, there may be a slot format that includes all the symbols newly defined in (1A-1) to (1A-3). That is, in the same slot, the symbol (S) dedicated to the sidelink communication, the symbol (U/S) capable of selecting the uplink communication or the sidelink communication, and the symbol (U and S) capable of simultaneously performing the uplink communication and the sidelink communication may all be included.

[1B: Method of Using Existing Symbol for Sidelink Communication]

Next, a method of using an existing symbol for sidelink communication will be described. In other words, in (1A) above, the symbol for the sidelink communication is newly defined, but in (1B), the symbol for the sidelink communication is not newly defined. There are two method of using existing symbols for sidelink communication.

(1B-1) Symbols are used for uplink communication for sidelink communication
(1B-2) Flexible symbols are used for sidelink communication

[1B-1: Symbol for Uplink Communication as Symbol is Used as Sidelink Communication]

Figure 25:
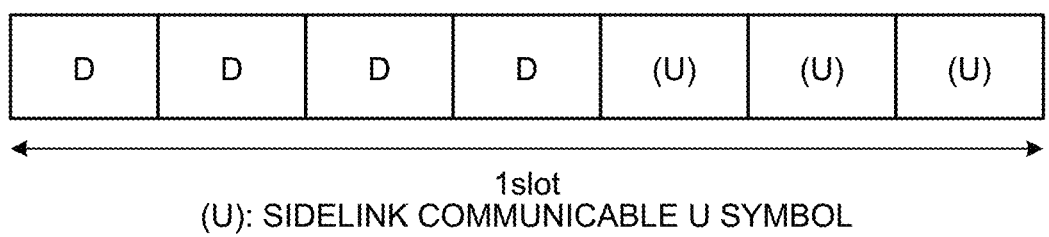
FIG. 25 is a diagram illustrating an example of the slot format including the symbol for performing the sidelink communication.

First, a case where a symbol for uplink communication is used for sidelink communication will be described. FIG. 25 is a diagram illustrating an example of a slot format including a symbol for performing sidelink communication. In the slot format illustrated in FIG. 25, the first to fourth symbols are the downlink symbols (D), and the fifth to seventh symbols are the uplink symbols ("(U)") capable of the sidelink communication. When the slot format illustrated in FIG. 25 is used, the terminal device performs the downlink communication with the first to fourth symbols in the slot, and performs any of the following (a) to (c) communications with the fifth to seventh symbols.

(a) Sidelink communication
(b) Uplink communication
(c) Simultaneous execution of sidelink communication and uplink communication Note that the base station notifies the terminal device of which of the above (a) to (c) communications is to be performed by the terminal device, and a specific example of this notification will be described later.

[(1B-2): Flexible Symbol is Used for Sidelink Communication]

Figure 26:
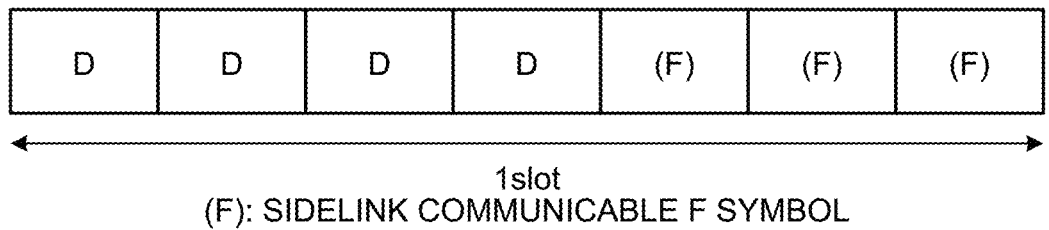
FIG. 26 is a diagram illustrating an example of the slot format including the symbol for performing the sidelink communication.

Second, a case where a symbol for a flexible symbol is used for sidelink communication will be described. FIG. 26 is a diagram illustrating an example of a slot format including a symbol for performing sidelink communication. In the slot format illustrated in FIG. 26, the first to fourth symbols are the downlink symbols (D), and the fifth to seventh symbols are the flexible symbol ("(F)") capable of the sidelink communication. When the slot format illustrated in FIG. 26 is used, the terminal device performs the downlink communication with the first to fourth symbols in the slot, and performs any of the following (a) to (d) communications with the fifth to seventh symbols.

(a) Sidelink communication
(b) Uplink communication
(c) Downlink communication
(d) Simultaneous execution of sidelink communication and uplink communication Note that the base station notifies the terminal device of which of the above (a) to (d) communications is to be performed, and a specific example of this notification will be described later.

3-2. (2) Method of Configuring Slot Format (Slot Configuration)

[Method of Configuring Slot Format]

Next, the method of configuring a slot format will be described. The configuration of the slot format is performed on the terminal device from the base station. There are the following two method of configuring a slot format.

(2A) Method of configuring a slot format for each cell (from the viewpoint of the base station)
(2B) Method of configuring a slot format for each terminal

[2A: Method of Configuring a Slot Format for Each Cell]

First, the method of configuring a slot format for each cell (from the viewpoint of the base station) will be described. In this case, the base station configures the same slot format for all terminal devices existing in the same cell. Specifically, the base station can configure the slot format for each cell by one of the following three methods.

(2A-1) Configuration by RRC signaling
(2A-2) Configuration by group common PDCCH
(2A-3) Configuration in combination with RRC signaling and PDCCH (including group common) (downlink control information (DCI))

[(2B) Method of Configuring Slot Format for Each Terminal]

Secondly, the method of configuring a slot format for each terminal will be described. In this case, the base station individually configures the slot formats for each terminal devices existing in the cell. Specifically, the base station can configure the slot format for each terminal by one of the following three methods.

(2B-1) Configuration by UE specific RRC signaling (dedicated signaling)
(2B-2) Configuration by PDCCH (DCI)
(2B-3) Configuration in combination with RRC signaling and PDCCH (downlink control information (DCI))

Note that when the slot format is configured for each terminal, the configuration method may be further divided into the following two methods.

(2B-A) When there are a plurality of cells configured in the same UE, for each cell
(2B-B) When a plurality of BWP is set in at least one cell, for each BWP

[Notification Contents to Terminal]

When the base station notifies the terminal device of the configuration of the slot format, the notification contents differ in the following two patterns. The notification contents in each pattern will be described in detail below.

(Pattern 1) When a new symbol for sidelink communication is defined
(Pattern 2) When using an existing symbol for sidelink communication

[(Pattern 1) when a New Symbol for Sidelink Communication is Defined]

The notification contents when a new symbol for sidelink communication is defined will be described. In this case, first, the base station newly generates a slot format including a symbol for sidelink communication according to the definition shown in (1A) above. Alternatively, a slot format including symbols for sidelink communication is newly defined in 3GPP or the like, and the base station uses an index corresponding to each slot format as slot format information. The newly generated slot format information is, for example, information indicating the state pattern of 14 symbols when the number of symbols in one slot is 14. Specifically, the base station stores a list of symbol patterns in the slot format as table information, and adds the newly generated slot format information to this table information. More specifically, there is a reserved information area in this table information, and a newly generated slot format is added to this reserved information area. Furthermore, more specifically, when the table information is composed of 0 to 255 (256) formats, the range of 56 to 254 is the reserved information area (format), and the newly generated slot format is written to any of 56 to 254. In other words, one of the 56 to 254 slot formats is assigned to the newly generated slot format.

Then, when the base station configures the newly generated slot format (or slot format information) for each cell, the new slot format is notified (configured) in all terminal devices present in the cell by either RRC signaling, PDCCH (DCI), or a combination of RRC signaling and PDCCH (DCI) by the above (2A-1) to (2A-3), that is, by a method of any one of RRC signaling, PDCCH (DCI), or a combination of the RRC signaling and the PDCCH (DCI).

In this case, the base station may notify the terminal device of the state of each symbol in the newly generated slot format as it is. Specifically, when the base station newly generates the slot format illustrated in FIG. 22, the base station notifies the terminal device of information indicating slot format "DDDDSSS". That is, the base station notifies the terminal device of the information in which the symbol states in the slot format are arranged. Further or instead, at this time, the base station may notify of the corresponding format number (for example, range of 56 to 254) in order to notify the terminal device of the newly generated slot format.

Note that the base station may notify of the assigned slot format combination ID together with the information in which the states of the symbol are arranged. That is, when a plurality of SlotFormats are configured in advance by the RRC signaling, the base station generates one or a plurality of Slot Format Combinations including one or a plurality of SlotFormats, and configures an ID for each Slot Format Combination. The ID (SlotFormatCombinationID) may be notified to the terminal device.

Further or instead, the base station may notify of the newly generated slot format (or slot format information) by including it in the above-described TDD configuration information (TDD-UL-DL-ConfigurationCommon). Further or instead, the TDD configuration information described above may be extended to notify the terminal device of the new slot format generated. For example, TDD-UL-DL-ConfigurationCommon may be named TDD-UL-DL-SL-ConfigurationCommon.

In addition, when the base station configures the newly generated slot format for each terminal, the base station individually notifies (configures) each terminal device of the newly generated slot format by (2B-1) to (2B-3) described above, that is, by either UE specific RRC signaling (dedicated signaling), PDCCH (DCI), or a combination of RRC signaling and PDCCH (DCI). In this case as well, the base station may notify the terminal device of the state of each symbol in the newly generated slot format as it is, or may notify of the corresponding Format number (range 56-254) in order to notify the terminal device of the newly generated slot format. Furthermore, the base station may notify of the assigned slot format combination ID together with the information in which the states of the symbol are arranged. That is, when a plurality of SlotFormats are configured in advance by the RRC signaling, the base station generates one or a plurality of Slot Format Combinations including one or a plurality of SlotFormats, and configures an ID for each Slot Format Combination. The ID (Slot Format Combination ID) may be notified to the terminal device.

Further or instead, the base station may notify of the newly generated slot format (or slot format information) by including it in the above-described TDD configuration information (TDD-UL-DL-ConfigDedicated). Further or instead, the TDD configuration information described above may be extended to notify the terminal device of the new slot format generated. For example, TDD-UL-DL-ConfigDedicated may be named TDD-UL-DL-SL-ConfigDedicated.

[(Pattern 2) when Using an Existing Symbol for Sidelink Communication]

Next, the notification contents using an existing symbol for sidelink communication will be described. When using the existing symbol for sidelink communication, the base station may need to notify the terminal device of the following two points.

(A) Notification of which existing symbol will be used for sidelink communication (B) Notification of what kind of communication the symbols that can (also) can be used for sidelink communication are used for.

As the notification (configuration) method of (A) and (B) above, notification (configuration) can be performed by any one of the following two methods or a combination thereof.

Method of defining new RRC configuration and notify

Method of newly defining and notifying of the DCI for the sidelink communication

[(A) Notification of which Existing Symbol is Used for Sidelink Communication]

The base station needs to notify (configure) the terminal device of which existing symbol (which uplink symbol or flexible symbol) is to be used for the sidelink communication among the slot formats configured for the terminal device. When making this notification (configuration), the base station can notify by, for example, a bitmap.

Specifically, for example, suppose that the current slot format is "FFFFUUUUUFFFUU". For example, when the base station indicates that the first to fourth flexible symbols can be used for the sidelink communication, the base station notifies the terminal device of the configuration bitmap of "11110000000000". Upon receiving this notification, the terminal device can use the first to fourth flexible symbols of the slot format "FFFFUUUUUFFFUU" for the sidelink communication. Note that the base station may notify of (configure) the slot format in association with the slot format number or the slot format combination ID together with the above bitmap "11110000000000". As a result, it can be understood that the terminal device corresponds to the bitmap of "11110000000000" and the slot format "FFF-FUUUUUFFFUU".

[(B) Notification of What Kind of Communication the Symbols that can (Also) is Used for Sidelink Communication are Used For]

When using the existing symbol for the sidelink communication, as shown in (1B) above, the base station needs to notify (configure) the terminal device of which of sidelink communication only, uplink communication only, a simultaneous communication of the sidelink communication and uplink communication is to be performed. In other words, the base station needs to indicate whether to use the symbols that can be (also) used for sidelink communication only for the sidelink communication or to use the sidelink communication and the uplink communication together.

When making this notification, the base station can notify by, for example, a bitmap. Specifically, when the base station uses the first and second symbols of the slot format "FFF-FUUUUUFFFUU" only for the sidelink communication, and uses the third and fourth symbols together in the sidelink communication and the uplink communication, the base station notifies the terminal device of the bitmap of "1100xxxxxxxxxxxx". Note that "x" in the above bitmap indicates that any value of 0 or 1 can be used. As a result, the terminal device can use the first and second symbols only for the sidelink communication, and use the third and fourth symbols for simultaneous communication of the sidelink communication and uplink communication, among the slot format "FFFFUUUUUFFFUU".

Note that the slot format number or slot format combination ID may be associated with the bitmap "1100xxxxxxxxxxxx" in this case. As a result, it can be understood that the terminal device corresponds to "1100xxxxxxxxxxxx" and the slot format "FFFFUUUUUFF-FUU".

Note that the notification method using a bitmap has been described above as an example. In addition to the above bitmap notification method, for example, a symbol number (nbr symbol) and a communication type (type symbol) possible by the symbol may be associated with each symbol in the slot format and notified to the terminal device. For example, when indicating the use of the fifth symbol for the sidelink communication, the information associated with nbr symbol "0101" and type symbol "1" (bit value indicating that the symbol for the sidelink communication is assumed to be "1") is notified to the terminal device. Upon receiving this notification, the terminal device can use the fifth symbol in the slot format for the sidelink communication.

Next, a more detailed example of the configuration notification will be described using TDD configuration information (TDD-UL-DL-ConfigurationCommon and TDD-UL-DL-ConfigDedicated) as an example. For example, the TDD configuration information may include the following information (6) and (7) on the sidelink communication in addition to the above information (1) to (5).

(6) The positions and number of sidelink symbols
(7) All sidelinks (all sidelinks) for each symbol Note that for the above (6), it may be notified as the sequence information of the sidelink symbol, or it may be the sequence information of the bitmap. More specifically, a message structure (ASN.1) as illustrated in FIG. 27 may be used. FIG. 27 is a diagram illustrating an example of configuration notification. Note that in FIG. 27, an underlined part in bold indicates the information element (Information Element) for which new provisions are considered to notify the terminal device of information on the sidelink communication. For example, "pattern3" (TDD-SL Pattern) may be newly specified in TDD-UL-DL-Configuration-Common. In the "TDD-SL Pattern" IE can select (make CHOICE) "symbols" and "bitmaps" as the pattern type. When "bitmaps" are chosen, "oneSlot" and "twoSlot" may be configured by "symbolBitmapsForSlotFormat". "symbolBitmapsForSlotFormat" may indicate the above-described bitmap by "oneSlot" or "twoSlot". On the other hand, when the "symbols" are chosen as the pattern type, "nrofSidelinkSymbols" may be configured. Here, the "nrofSidelinkSymbols" correspond to the "number of sidelink symbols" among the positions and numbers of (6) sidelink symbols described above.

Furthermore, "allSidelink" may be newly specified in "symbols" in TDD-UL-DL-ConfigDedicated. Furthermore, "nrofSidelinkSymbols" may be newly specified in "explicit" in the same "symbols".

Here, "nrofSidelinkSymbols" may be defined as follows. That is, "nrofSidelinkSymbols" indicates the number of consecutive sidelink symbols starting with the last following symbol of the downlink symbol specified by nrofDownlinkSymbols. Here, the consecutive sidelink symbols may or may not overlap with some of the consecutive uplink symbols, depending on the configuration and the capabilities of the UE.

In addition, the above-described "symbolBitmapsForSlotFormat" may be defined as follows. That is, "symbolBitmapsForSlotFormat" indicates a bitmap symbol pattern for defining one or a plurality of sidelink symbols in one or two slots. This bitmap symbol pattern is mapped to the uplink or downlink TDD configuration (for example, the slot format described above) configured on the UE.

3-3. (3) Method of Changing Slot Format

In above (1), the case of designing a new slot format including symbols for the sidelink communication is shown. In addition, the above (2), the case where the existing symbol is used for the sidelink communication is shown. In the above (3), a case of changing the symbol of the slot format will be described. Note that changing a symbol may also be referred to as symbol reconfigure or symbol override.

First, an operation example of the base station and the terminal device when changing the symbol of the slot format will be described. Specifically, the following two types of operation examples of the base station and terminal device when changing the symbol in the slot format can be considered.

(3A) The base station determines to change a symbol and instructs the terminal device to change the symbol
(3B) The terminal device determines to change the symbol and changes the symbol

[(3A) the Base Station Determines to Change a Symbol and Instructs the Terminal Device to Change to the Symbol]

First, the base station may determine to change a symbol and instruct the terminal device to change the symbol. The following four types of operation examples of the base station in this case can be considered In each case, the operation of the base station and the terminal device will be specifically described.

(3A-1) Change (reconfigure/override) slot format configured by RRC signaling with DCI
(3A-2) Change slot format configured in DCI with RRC (reconfigure/override)
(3A-3) Change slot format configured in cell specific RRC with UE specific RRC (reconfigure/override)
(3A-4) Change a slot format configured in group common PDCCH with UE specific DCI (reconfigure/override)

When the base station notifies the terminal device of the configuration of the slot format by the method shown in (3A-1) to (3A-4) and then the predetermined information transmitted from the terminal device satisfies the predetermined override conditions, the symbol override in the configured slot format by the method shown in (3A-1) to (3A-4) is instructed. Note that the override condition is a condition for overriding the state of the symbol, but the details of the condition will be described later. In addition, the predetermined information transmitted from the terminal device is, for example, information such as the channel congestion state (channel busy ratio (CBR)), the traffic model of the terminal device, the service type of the sidelink communication, and the priority information (priority information) of the communication, the interference level, and the resource usage state.

Hereinafter, the operations of the base station and the terminal device in (3A-1) to (3A-4) will be specifically described.

[3A-1: Change Slot Format Configured by RRC Signaling with DCI]

(Operation of Base Station)

In this case, the base station, for example, changes the slot format configured by RRC signaling with the DCI for the sidelink communication. Specifically, first, the base station configures the slot format in the terminal device by the RRC signaling. Note that the slot format configured by the RRC signaling may be one or a plurality of symbols in one or a plurality of slots configured by TDD configuration information (TDD-UL-DL-ConfigurationCommon or TDD-UL-DL-ConfigDedicated). Further, the slot format configured by the RRC signaling may be one or a plurality of slot formats included in one or a plurality of SlotFormat Combination ID.

Subsequently, the base station determines the symbol override when the override conditions described later are satisfied, and notifies the terminal device of the symbol change using the DCI for the sidelink communication. For example, the base station notifies the terminal device of the symbol number of the symbol to be changed and the state of the symbol after the change. Note that the details of the override conditions will be described later.

(Operation of Terminal Device)

In the case of (3A-1), the terminal device first configures the slot format notified by the RRC signaling from the base station. Subsequently, when the base station notifies of the symbol change by the DCI for the sidelink communication, the terminal device overrides the symbol state in the slot format according to the notification contents.

3A-2: Change Slot Format Configured in DCI with RRC (Operation of Base Station)

In this case, the base station first notifies the terminal device of one or a plurality of slot formats by DCI format 2_0 including SFI that specifies one or a plurality of slot formats (for example, SlotFormatCombination). Subsequently, the base station determines the symbol override when the override conditions described later are satisfied, and notifies the change of the symbol by, for example, a predetermined RRC configuration (various configuration information described above (for example, TDD configuration information)). For example, the base station notifies the terminal device of the symbol number of the symbol to be changed, a slot including the symbol to be changed, and the state of the changed symbol.

(Operation of Terminal Device)

In the case of (3A-2), the terminal device configures one or a plurality of slot formats (for example, SlotFormatCombination) specified by SFI in DCI format 2_0 transmitted from the base station. Subsequently, the terminal device overrides the symbol state according to the RRC configuration from the base station. That is, the specific symbol in the slot indicated by the RRC configuration is overridden so as to be in the changed symbol state indicated by the RRC configuration.

(3A-3) Change Slot Format Configured in Cell Specific RRC with UE Specific RRC (Reconfigure/Override)

(Operation of Base Station)

In this case, the base station notifies the terminal device existing in the cell of the slot format to be configured by the cell specific RRC (for example, TDD-UL-DL-ConfigurationCommon). Subsequently, the base station determines the symbol override when the override conditions described below are met, and uses UE specific RRC (for example, TDD-UL-DL-ConfigDedicated) to individually notify the terminal device that should override the symbol of the symbol change. For example, when using TDD-UL-DL-ConfigDedicated, the base station may be configured so that the symbol for the sidelink communication is included in a plurality of symbols to be configured. In addition, the base station may transmit TDD-UL-DL-ConfigDedicated, which includes the symbol for the sidelink communication in the configuration, to the terminal device after transmitting TDD-UL-DL-ConfigurationCommon. When the UE receives the TDD-UL-DL-ConfigDedicated, if TDD-UL-DL-ConfigurationCommon is already configured, the UE may reconfigure/override its own configuration with TDD-UL-DL-ConfigDedicated.

(Operation of Terminal Device)

In the case of (3A-3), the terminal device first configures the slot format specified by TDD-UL-DL-ConfigurationCommon received from the base station. Next, the terminal device determines the symbol override when the override condition described later is satisfied, and performs the override on the symbol in the slot specified by TDD-UL-DL-ConfigDedicated so that the symbol is in the state of the symbol specified in the TDD-UL-DL-ConfigDedicated when receiving TDD-UL-DL-ConfigDedicated from the base station.

[3A-4: Change Slot Format Configured in Group Common PDCCH with UE Specific DCI]

(Operation of Base Station)

In this case, the base station first notifies the terminal device of the slot format to be configured by the group common PDCCH. The slot format specified by the group common PDCCH may be the one or plurality of slot formats indicated by the SlotFormatCombination identified by the SlotFormat Combination ID corresponding to the SFI specified by DCI format 2_0. Subsequently, the base station notifies of the change of the symbol by the UE specific DCI. For example, the UE specific DCI may be the DCI for the sidelink communication. That is, the symbol in the one or plurality of slot format indicated by the SlotFormatCombination identified by the SlotFormat Combination ID corresponding to the SFI specified in DCI format 2_0 is reconfigured by the DCI for the sidelink communication. Note that the DCI for the sidelink communication here may include information indicating the symbol to be changed (overridden), the slot including the symbol, and the state of the changed symbol.

(Operation of Terminal Device)

In the case of (3A-4), the terminal device configures one or plurality of slot formats indicated by the SlotFormatCombination identified by the SlotFormat Combination ID corresponding to the SFI specified by DCI format 2_0 received from the base station. Subsequently, the terminal device overrides the symbol in slot format based on the DCI for the sidelink communication received from the base station. Note that the DCI for the sidelink communication here may include information indicating the symbol to be changed (overridden), the slot including the symbol, and the state of the changed symbol.

[3B: Terminal Device Determines to Change Symbol and Changes Symbol]

Second, the terminal device may determine to change the symbol and change the symbol. In other words, instead of receiving instructions from the base station, the terminal device itself determines to change the symbol. The operations of the base station and the terminal device in this case are as follows. First, an operation example of the base station is as follows.

(Operation of Base Station)

The base station configures the override condition described later and notifies the terminal device. The base station notifies the terminal device of the override condition by, for example, RRC or DCI. Note that the base station may notify all the terminal devices in the cell of the configured override conditions, notify of the configured override conditions in a specific group unit including a plurality of terminal devices in the cell, or notify a terminal device of the configured override conditions individually. Note that when notifying the terminal device individually, for example, the dedicated channel may be used for notification.

(Operation of Terminal Device)

The terminal device overrides the symbol in the slot format when the information related to communication in its own device meets the override condition configured by the base station. Then, when the terminal device overrides the symbol, the terminal device notifies the base station and other terminal devices that the symbol has been overridden.

The terminal device notifies the base station that the symbol has been overridden by, for example, PUCCH or PUSCH. In addition, the terminal device transmits the PUCCH and PUSCH using uplink symbols or flexible symbols that are not overridden among the symbols in the slot format In addition, the terminal device notifies other terminal devices that the symbol has been overridden, for example, by PSCCH, PSSCH, or PSFCH. The terminal device transmits the PSCCH, the PSSCH or the PSFCH using the uplink symbol, the flexible symbol, and the sidelink symbol that are not overridden among the symbols in the slot format.

Note that other terminal devices that have received this notification may override their own slot format symbols or do not have to override the slot format symbols in order to perform sidelink communication with the terminal device. For example, when other terminal device is outside the cell of the base station, the terminal overrides the current slot format with the new slot format notified by the terminal device and performs communication using the new slot format. This makes it possible to perform the sidelink communication with the terminal device when the base station cannot communicate with other terminal device.

In addition, other terminal devices do not override the current slot format when the terminal devices are in the cell of the base station, and perform communication using the current slot format. In other words, when other terminal devices can communicate with the base station, the terminal devices should not override the symbol for the sidelink communication in order to prioritize communication with the base station.

(Override Condition)

Next, a specific example of the above-described override conditions will be described. For example, the following conditions can be considered as the override conditions. Note that the override conditions may be configured by the base station as described above, or may be specified in the standard in advance.

CBR (Channel Busy Ratio)
Traffic model (for example, packet size or cycle)
QoS (Quality of Service) requirement
Priority information

[CBR]

For example, the base station determines the symbol override when the CBR reported by the terminal device meets the preset override conditions. For example, when the base station determines that the communication channel of the sidelink communication is congested based on the CBR, the base station overrides the uplink symbol or the flexible symbol in the current slot format to the sidelink symbol or uplink/sidelink symbol. As a result, the resources that can be used for the sidelink communication increase, and the congestion state of communication can be improved. Note that when the terminal device determines the symbol override by itself, the terminal device determines the symbol override based on the CBR acquired by the terminal device and overrides the symbol.

[Traffic Model]

For example, the base station determines the symbol override when the traffic model reported by the terminal device meets the preset override conditions. Specifically, the base station predicts the transmission timing of the terminal device and the amount of resources required for transmission based on the traffic model, and overrides the symbols so that the slot format matches the prediction result. For example, a base station (or terminal device) overrides the uplink symbol or the flexible symbol to the sidelink symbol or the uplink/sidelink symbol when a packet size of the sidelink communication of the terminal device is large. As a result, the amount of resources for the sidelink communication increases, so appropriate communication can be performed even when the packet size is large. In addition, the base station (or terminal device) may reduce the total number of sidelink symbols when transmitting multiple times in a predetermined slot format, for example, when the transmission cycle of the terminal device is long. That is, when the transmission cycle of the terminal device is long, the sidelink symbols in the slot format for multiple times may be relatively reduced. Note that when the terminal device determines the symbol override by itself, the terminal device determines the symbol override based on the traffic model acquired by the terminal device and overrides the symbol.

[QoS]

Figures 28, 29:
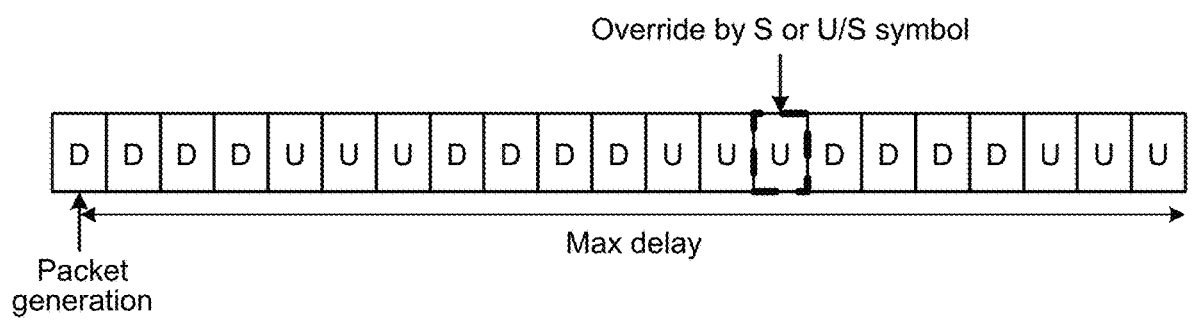
FIG. 28 is a diagram illustrating an example of a symbol override.
FIG. 29 is a diagram illustrating a symbol override pattern in a slot format

For example, the base station determines the symbol override based on the QoS requirements of the terminal device. This point will be described with reference to FIG. 28. FIG. 28 is a diagram illustrating an example of the symbol override. In order to satisfy the maximum delay requirement from the packet generation of the first symbol when the symbols are used in the order (from left to right on the page) illustrated in FIG. 28, the base station overrides any uplink symbol illustrated in FIG. 27 (fourteenth symbol in FIG. 27) with a symbol capable of the sidelink communication (sidelink communication alone or sidelink communication and uplink communication may be used in combination). As a result, in the overridden slot format, the sidelink communication can be performed at the fourteenth symbol, so the maximum delay request in the sidelink communication can be satisfied. Note that when the terminal device determines the symbol override by itself, the terminal device determines the symbol override based on the QoS requirements and overrides the symbol.

[Priority Information]

For example, the base station determines the symbol override based on the priority information indicating the communication priority. For example, it is assumed that the base station configures a symbol for simultaneous communication of sidelink and uplink in the terminal device in the current slot format. In such a case, the base station overrides the symbol of the communication type (communication type with high priority) to be prioritized among the sidelink symbols or the uplink symbols based on the priority information of the terminal device. As a result, the simultaneous communication of the sidelink communication and the uplink communication can be avoided, and the priority communication among the sidelink communication and the uplink communication can be performed with priority.

[Specific Example of Symbol Override]

When overriding a slot format symbol, the override pattern is as illustrated in FIG. 29. FIG. 29 is a diagram illustrating a symbol override pattern in the slot format. In FIG. 29, the sidelink symbol is indicated by "S", the downlink symbol is indicated by "D", the uplink symbol is indicated by "U", and the flexible symbol is indicated by "F". According to FIG. 28, the combinations that can be symbol overridden ("Y" illustrated in FIG. 29) are as follows.

Override from F symbol to S symbol
Override from F symbol to U/S symbol
Override from U symbol to S symbol
Override from U symbol to U/S symbol
Override from S symbol to U symbol
Override from S symbol to F symbol or U/S symbol
Override from U/S symbol to U symbol or S symbol Hereinafter, each of the above overrides will be specifically described

[Override from F Symbol to S Symbol]

This is the case when the flexible symbol included in the existing slot format is overridden to the symbol for the sidelink communication. This allows the terminal device to perform the sidelink communication using the flexible symbol in the slot format. That is, the sidelink communication can be performed without interfering with the communication by the uplink symbol or the downlink symbol configured in the existing slot format.

[Override from F Symbol to U/S Symbol]

This is a case of overriding the flexible symbol included in the existing slot format to the symbol capable of performing the uplink communication and the sidelink communication. As a result, the terminal device can use the flexible symbol to perform either the sidelink communication or the uplink communication (sidelink or uplink), or the simultaneous communication (sidelink and uplink) of the sidelink communication and the uplink communication.

For example, as the use case where the sidelink communication or the uplink communication (sidelink or uplink) symbol is configured, the terminal device basically performs the uplink communication using the overridden symbol, for example, in the same slot format, and when other sidelink symbols cannot be used, performs the sidelink communication using the overridden symbol. This makes it possible to support the use cases such as URLLC communication and resource preemption.

In addition, as the use case in which the symbol of the simultaneous communication (sidelink and uplink) of the sidelink communication and the uplink communication is configured, the terminal device transmits information to the base station by, for example, the uplink communication and at the same time transmits information to other terminals or the like by sidelink communication. This makes it possible to deal with, for example, a use case in which HARQ feedback is simultaneously transmitted to a base station and other terminals.

[Override from U Symbol to S Symbol]

This is the case when the symbol for the uplink communication included in the existing slot format is overridden to the symbol for the sidelink communication. This override is performed, for example, when there is no flexible symbol in the slot format, or when override is not possible even if there is a flexible symbol. Alternatively, this override is performed when the required number of sidelink symbols is insufficient in the current slot format. For example, the terminal device overrides the existing symbol so that the sidelink symbols are consecutive when a consecutive sidelink symbol is required along the time axis.

Specifically, when there is a slot format called "DDDDDDDDDDSSUSS", the thirteenth uplink symbol is overridden to the sidelink symbol. As a result, the eleventh to fifteenth consecutive symbols can be used for the sidelink communication. Alternatively, when the flexible symbol can be used for the sidelink communication, the thirteenth uplink symbol in the slot format of "DDDDDDDDDDF-FUFF" can be overridden to the sidelink symbol (or flexible symbol), and thus, the eleventh to fifteenth consecutive symbols can be used for the sidelink communication.

[Override from U Symbol to U/S Symbol]

This is a case where the symbol for the uplink communication included in the existing slot format is overridden to a symbol capable of performing the uplink communication and the sidelink communication. Specifically, it overrides either the sidelink communication or the uplink communication (sidelink or uplink), or simultaneous communication (sidelink and uplink) of the sidelink communication and the uplink communication. As a result, since the terminal device is in a state where the uplink communication is possible even after the override, the sidelink communication can be performed while minimizing the influence of the uplink symbol override on the uplink communication.

Further, for example, the terminal device can determine whether to perform the uplink communication or the sidelink communication based on the above-described priority information. As a specific use case, the terminal device is assumed to be a use case in which the PDSCH is received from the base station and the HARQ feedback is transmitted 4 ms later. In this case, by overriding the symbol to the U/S symbol after 4 ms, when the HARQ feedback is prioritized based on the priority information, the uplink communication is performed with the base station and when giving priority to safety messages based on priority information, the sidelink communication with other terminal devices is performed. Alternatively, the terminal device performs the simultaneous communication of the uplink communication and the sidelink communication when the priority of the uplink communication and the sidelink communication is the same. In this way, by overriding the uplink symbol to the symbol capable of performing the uplink communication and the sidelink communication, it is possible to flexibly support communication according to the priority information.

[Override from S Symbol to U Symbol]

This is the case where the sidelink symbol included in the slot format newly generated by the above (1A) is overridden to the uplink symbol. As such a use case, it is assumed that the uplink symbol is insufficient with the existing slot format because the amount of transmitted data of the information for the uplink communication is large. Specifically, the base station overrides the sidelink symbol with the uplink symbol when the number of uplink symbols in the existing slot format is insufficient for the uplink communication of a large amount of data from the terminal device. As a result, for example, even if the number of flexible symbols is insufficient, a large amount of data can be transmitted to the base station by the uplink communication.

[Override from S Symbol to F Symbol or U/S Symbol]

This is the case in which the sidelink symbol included in the slot format newly generated by the above (1A) are overridden to the flexible symbol, or the symbol (sidelink or uplink symbol or sidelink and uplink symbol) capable of performing the sidelink communication and the uplink communication. As this use case, it is assumed that the traffic model of the sidelink communication is changed. For example, when changing from transmitting periodic traffic to transmitting non-periodic traffic, the terminal device wastes the resources of the sidelink symbol when the sidelink symbol that was to be used is no longer used due to this change. Therefore, since the terminal device can perform the uplink communication or the downlink communication by overriding the existing sidelink symbol to the flexible symbol or the symbol capable of the sidelink communication and the uplink communication in response to a change in traffic, even when the terminal device does not perform sidelink communication, the waste of resources can be minimized.

[Override from U/S Symbol to U Symbol or S Symbol]

This is the case in which the symbol (sidelink or uplink symbol or sidelink and uplink symbol) capable of the sidelink communication and the uplink communication included in the slot format newly generated by the above (1A) is overridden to the uplink symbol or the sidelink symbol. As such a use case, it may be necessary for the receiving terminal to determine whether the transmission of the transmitting terminal is the uplink communication or the sidelink communication.

Specifically, the receiving terminal needs to perform blind decoding in order to determine whether the transmission from the transmitting terminal is the uplink communication or the sidelink communication, and as a result, the decoding complexity may increase. For example, by overriding the symbol (sidelink or uplink) capable of performing the sidelink communication or the uplink communication to the uplink symbol or the sidelink symbol, it is not necessary for the receiving terminal to perform decoding for discrimination.

In addition, the receiving terminal overrides the symbol (sidelink and uplink symbol) capable of performing the sidelink communication and the uplink communication to the uplink symbol or the sidelink symbol to perform Sidelink Measurement, and as a result, it is possible to avoid situations where the results of energy evaluation are not appropriate.

Furthermore, by allowing the transmitting terminal to perform the uplink communication or the sidelink communication (sidelink or uplink) on the transmitting terminal side, when power sharing is not performed well or when the uplink communication and the sidelink communication (sidelink and uplink) are performed, even if inter subcarrier interference occurs with each other, by overriding the uplink symbol or sidelink symbol, the problem that occurs in such a case can be solved.

4. MODIFICATIONS

The above embodiment is an example, and further or instead, various modifications and applications are possible. At least a part of the following modifications may be applied to some or all of the above-described embodiments.

For example, in the above-described TDD-UL-DL-ConfigurationCommon and TDD-UL-DL-ConfigDedicated, may be configured so that the slot configuration configured in the terminal device (UE) includes one or a plurality of downlink symbols, the uplink symbol, the flexible symbol, the sidelink symbol. Also, the above-described DCI format 2_0 may indicate that the slot format configured in the terminal device includes one or a plurality of downlink symbols, the uplink symbol, the flexible symbol, and the sidelink symbols, either directly or indirectly via SFI. Note that the SFI may be associated with SlotFormat Combination ID on a one-to-one basis. The SlotFormat Combination ID may correspond to one or a plurality of slot formats.

Further or instead, when the following conditions (a) to (d) are satisfied, the terminal device uses the flexible symbol (or a set thereof) to perform the sidelink (SL) transmission or the SL reception on the physical sidelink channel.

(a) Slot configuration configured on the terminal device by TDD-UL-DL-ConfigurationCommon and TDD-UL-DL-ConfigDedicated includes one or a plurality of flexible symbols, or TDD-UL-DL-ConfigurationCommon and TDD-UL-DL-ConfigDedicated is not provided to the terminal device, (b) The terminal device detects (receives) DCI format 2_0 including SFI to provide the slot format, and the DCI format 2_0 indicates a plurality of symbols (or a set thereof) as the flexible symbol, (c) The terminal device does not detect the DCI format (for example, DCI format 1_0, DCI format 1_1, or DCI format 0_1) for receiving PDSCH and CSI-RS, or the terminal device does not detect the DCI format (for example, DCI format 0_0, DCI format 0_1, DCI format 1_0, DCI format 1_1, and DCI format 2_3) or RAR UL grant for sending PUSCH, PUCCH, PRACH, or SRS, and (d) DCI format X_Y indicating SL transmission or SL reception on physical sidelink channel is received by terminal device.

In this case, the terminal device may override or reconfigure the flexible symbol (or its set) to the symbol (or its set) for SL transmission or SL reception on the physical sidelink channel, and may transmit or receive the physical sidelink channel. In other words, in this case, the terminal device may recognize (consider) the flexible symbol (or its set) as the symbol (its set) for the SL transmission or the SL reception on the physical sidelink channel, or may assume the flexible symbol (or its set) to be the symbol for the SL transmission or the SL reception on the physical sidelink channel and then perform the SL transmission or the SL reception on the physical sidelink channel. Note that the conditions (a) to (d) in this case may also be used as conditions (override conditions) for determining whether to perform (or instruct) the symbol override by the methods shown in (3A-1) to (3A-4) described above.

Further or instead, when the following conditions (a) to (d) are satisfied, the terminal device uses the flexible symbol (or a set thereof) to perform the SL transmission or the SL reception on the physical sidelink channel.

(a) Slot configuration configured on the terminal device by TDD-UL-DL-ConfigurationCommon and TDD-UL-DL-ConfigDedicated includes one or a plurality of flexible symbols, or TDD-UL-DL-ConfigurationCommon and TDD-UL-DL-ConfigDedicated is not provided to the terminal device, (b) The terminal device does not receive DCI format 2_0, which includes SFI to provide the slot format, and (c) DCI format X_Y indicating SL transmission or SL reception on physical sidelink channel is received by terminal device.

In this case, the terminal device may override or reconfigure the flexible symbol (or its set) to the symbol (or its set) for SL transmission or SL reception on the physical sidelink channel, and may transmit or receive the SL transmission or the SL reception on the physical sidelink channel. In other words, in this case, the terminal device may recognize (consider) the flexible symbol (or its set) as the symbol (its set) for the SL transmission or the SL reception on the physical sidelink channel, or may assume the flexible symbol (or its set) to be the symbol (or its set) for the SL transmission or the SL reception on the physical sidelink channel and then perform the SL transmission or the SL reception on the physical sidelink channel. Note that the conditions (a) to (c) in this case may also be used as conditions (override conditions) for determining whether to perform (or instruct) the symbol override by the methods shown in (3A-1) to (3A-4) described above.

Note that the above-described physical sidelink channel may be any one of the following (a) to (d), and may include any one of (a) to (d).

(a) PSBCH (Physical Sidelink Broadcast Channel)
(b) PSCCH (Physical Sidelink Control Channel)
(c) PSDCH (Physical Sidelink Discovery Channel)
(d) PSSCH (Physical Sidelink Shared Channel)

In addition, the DCI format X_Y for the terminal device described above to transmit or receive the physical sidelink channel in SL may be defined as a new DCI format. For example, DCI format X_Y may be DCI format 3_0 or DCI format 5_0.

Further, the above-described DCI format X_Y may include the following information (a) to (c).

(a) Resource for PSCCH-6 bits
(b) TPC command for PSCCH and PSSCH-1bit
(c) SCI format 0 fields Further, the above-described (c) SCI format 0 fields may include the following information (c1) to (c3).

(c1) Frequency hopping flag
(c2) Resource block assignment and hopping resource allocation
(c3) Time resource pattern Further, the target to which the present embodiment is applied is not limited to the V2X communication. The present embodiment can be applied to use cases other than the V2X communication, which uses the sidelink communication. For example, application examples of the present embodiment include the D2D communication, the MTC communication, or the like. In addition, the present embodiment can also be applied to moving cells, relay communications, and the like. That is, in the present embodiment, the V2X communication does not have to be an indispensable component.

In addition, the present embodiment has been described as a method of allocating Mode3 resource allocation, but can also be applied to Mode4.

In addition, the present embodiment has been described as a method of an FDM type resource pool, but can also be applied to a TDM type resource pool.

In addition, the present embodiment is also applicable to multi-carrier communication in which sidelink communication is performed using a plurality of carriers.

Further, the control device for controlling the management device 10, the base station device 20, the base station device 30, the terminal device 40, or the mobile device 50 of the present embodiment may be realized by a dedicated computer system or a general-purpose computer system.

For example, a program for executing the above operation is stored in a computer-readable recording medium such as an optical disk, a semiconductor memory, a magnetic tape, or a flexible disk, and distributed. Then, for example, the control device is configured by installing the program on a computer and executing the above-described processing. In this case, the control device may be an external device (for example, a personal computer) of the management device 10, the base station device 20, the base station device 30, the terminal device 40, or the mobile device 50. In addition, the control device may be a device (for example, a control unit 13, a control unit 24, a control unit 34, a control unit 45, or a control unit 55) inside the management device 10, the base station device 20, the base station device 30, the terminal device 40, or the mobile device 50.

Further, the communication program may be stored in a disk device provided in a server device on a network such as the Internet, and may also be downloaded to a computer or the like. Further, the above-described functions may be realized by cooperation between the operating system (OS) and the application software. In this case, the part other than the OS may be stored in the medium and distributed, or the part other than the OS may be stored in the server device, and thus can be downloaded to the computer.

Further, of the processes described in the above embodiments, all or part of the processes described as being automatically performed can also be performed manually, or it is also possible to automatically perform all or part of the processing described as being performed manually by the known method. In addition, the processing procedures, specific names, and information including various data and parameters illustrated in the above documents and drawings can be changed arbitrarily unless otherwise specified. For example, various information shown in each drawing is not limited to the illustrated information.

In addition, each component of each device illustrated in the drawing is a functional concept, and does not necessarily have to be physically configured as illustrated in the drawing. That is, the specific form of distribution/integration of each device is not limited to the one illustrated in the drawing, and all or part thereof can be functionally or physically distributed/integrated in any unit according to various loads and usage conditions.

In addition, the above-described embodiments can be appropriately combined in an area where the processing contents do not contradict each other.

5. CONCLUSION

As described above, according to one embodiment of the present disclosure, the base station device (for example, base station device 20 and base station device 30) includes the communication unit (radio communication units 21 and 31) and the control units 24 and 34. The communication unit (radio communication units 21 and 31) communicates with the terminal device (terminal device 40 and mobile device 50). When at least one symbol included in the slot format configured in the terminal devices is a symbol for communication other than the sidelink communication, the control units 24 and 34 transmit, to the terminal devices, the information for use by the terminal devices as a symbol for the sidelink communication with at least one symbol. As a result, since the terminal device can perform the sidelink communication using the slot format of the NR, the requirements of various services in the NR V2X communication can be satisfied, and therefore, high communication performance can be realized.

Although each embodiment of the present disclosure has been described above, the technical scope of the present disclosure is not limited to each of the above-described embodiments as it is, and various changes can be made without departing from the gist of the present disclosure. In addition, components in different embodiments and modifications may be combined as appropriate.

Further, the effects in each embodiment described in the present specification are merely examples and are not limited, and other effects may be obtained.

Note that the present technology may also be configured as below.

(1)

A base station device, comprising:
a communication unit that communicates with a terminal device; and
when at least one symbol included in a slot format configured in the terminal device is a symbol for performing communication other than sidelink communication, a control unit that transmits, to the terminal device, information for use by the terminal device as a symbol for performing the sidelink communication using the at least one symbol.

(2)

The base station device according to (1), wherein
the control unit generates the slot format including the symbol for performing the sidelink communication, and transmits the generated slot format to the terminal device.

(3)

The base station device according to any one of (1) to (2), wherein
the control unit transmits, to the terminal device, information for changing the symbol for performing the communication other than the sidelink communication included in the slot format configured in the terminal device to the symbol for performing the sidelink communication.

(4)

The base station device according to (3), wherein
when the information reported from the terminal device satisfies a predetermined override condition, the control unit determines to change the symbol and transmits the information for changing to the symbol for performing the sidelink communication to the terminal device.

(5)

The base station device according to (4), wherein
the information reported from the terminal device is information on a congestion state of a channel.

(6)

The base station device according to (4), wherein
the information reported from the terminal device is information on a traffic model of the terminal device.

(7)

The base station device according to (4), wherein
the information reported from the terminal device is information on QoS requirement of the terminal device.

(8)

The base station device according to (4), wherein
the information reported from the terminal device is information on a communication priority of the terminal device.

(9)

The base station device according to any one of (1) to (8), wherein
the control unit transmits the information for use by the terminal device as the symbol for performing the sidelink communication using the at least one symbol to all terminal devices belonging to a cell managed by the base station.

(10)

The base station device according to any one of (1) to (9), wherein
the control unit individually transmits the information for use by the terminal device as the symbol for performing the sidelink communication using the at least one symbol to each of the terminal devices belonging to a cell managed by the base station.

(11)

The base station device according to any one of (1) to (10), wherein
the information for use by the terminal device using the at least one symbol as the symbol for the sidelink communication is bitmap information.

(12)

The base station device according to any one of (1) to (11), wherein
the symbol for performing the sidelink communication is a symbol for performing only the sidelink communication.

(13)

The base station device according to any one of (1) to (12), wherein
the symbol for performing the sidelink communication is a symbol for performing sidelink communication or uplink communication.

(14)

The base station device according to any one of (1) to (13), wherein
the symbol for performing the sidelink communication is a symbol for performing simultaneous communication of sidelink communication and uplink communication.

(15)

A method of controlling a base station device, comprising:
communicating with a terminal device; and
when at least one symbol included in a slot format configured in the terminal device is a symbol for performing communication other than sidelink communication, transmitting, to the terminal device, information for use by the terminal device as a symbol for performing the sidelink communication using the at least one symbol.

(16)

A terminal device, comprising:
a communication unit that communicates with a base station device; and
when at least one symbol included in a slot format configured in the terminal device is a symbol for performing communication other than sidelink communication, a control unit that receives, from the base station device, information for use by the terminal device as a symbol for performing the sidelink communication using the at least one symbol.

(17)

A method of controlling a terminal device, comprising:
communicating with a base station device; and
when at least one symbol included in a slot format configured in the terminal device is a symbol for performing communication other than sidelink communication, receiving, from the base station device, information for use by the terminal device as a symbol for performing the sidelink communication using the at least one symbol.

REFERENCE SIGNS LIST

1 INFORMATION PROCESSING SYSTEM
10 MANAGEMENT DEVICE
20, 30 BASE STATION DEVICE
40 TERMINAL DEVICE
50 MOBILE DEVICE
11, 23, 33, 43, 53 NETWORK COMMUNICATION UNIT
12, 22, 32, 42, 52 STORAGE UNIT
13, 24, 34, 45, 55 CONTROL UNIT
21, 31, 41, 51 RADIO COMMUNICATION UNIT
44, 54 INPUT/OUTPUT UNIT
211, 311, 411, 511 RECEPTION PROCESSING UNIT
212, 312, 412, 512 TRANSMISSION PROCESSING UNIT
213, 313, 413, 513 ANTENNA

The invention claimed is:

1. A base station device, comprising:
a transceiver; and
a control circuit that:
transmits, to a terminal device based on at least one symbol included in a slot format configured in the terminal device being a symbol for performing communication other than sidelink communication, information for use by the terminal device as a symbol for performing the sidelink communication using the at least one symbol,
receives information from the terminal device,
based on the information from the terminal device satisfying a predetermined override condition, determines to change the symbol for performing the communication other than sidelink communication to the symbol for performing the sidelink communication, and
transmits, to the terminal device, information for the terminal device to change from the symbol for performing the communication other than sidelink communication to the symbol for performing the sidelink communication.

2. The base station device according to claim 1, wherein the control circuit generates the slot format including the symbol for performing the sidelink communication, and transmits the generated slot format to the terminal device.

3. The base station device according to claim 1, wherein the information reported from the terminal device is information on a congestion state of a channel.

4. The base station device according to claim 1, wherein the information reported from the terminal device is information on a traffic model of the terminal device.

5. The base station device according to claim 1, wherein the information reported from the terminal device is information on quality of service (QoS) requirement of the terminal device.

6. The base station device according to claim 1, wherein the information reported from the terminal device is information on a communication priority of the terminal device.

7. The base station device according to claim 1, wherein the control circuit transmits the information for use by the terminal device as the symbol for performing the sidelink communication using the at least one symbol to all terminal devices, including the terminal device, belonging to a cell managed by the base station.

8. The base station device according to claim 1, wherein the control circuit individually transmits the information for use by the terminal device as the symbol for performing the sidelink communication using the at least one symbol to each of a plurality of terminal devices, including the terminal device, belonging to a cell managed by the base station.

9. The base station device according to claim 1, wherein the information for use by the terminal device using the at least one symbol as the symbol for the sidelink communication is bitmap information.

10. The base station device according to claim 1, wherein the symbol for performing the sidelink communication is a symbol for performing only the sidelink communication.

11. The base station device according to claim 1, wherein the symbol for performing the sidelink communication is a symbol for performing sidelink communication or uplink communication.

12. The base station device according to claim 1, wherein the symbol for performing the sidelink communication is a symbol for performing simultaneous communication of sidelink communication and uplink communication.

13. A method of communication performed by a base station device, the method comprising:
transmitting, to a terminal device based on at least one symbol included in a slot format configured in the terminal device being a symbol for performing communication other than sidelink communication, information for use by the terminal device as a symbol for performing the sidelink communication using the at least one symbol;
receiving information from the terminal device;
based on the information from the terminal device satisfying a predetermined override condition, determining to change the symbol for performing the communication other than sidelink communication to the symbol for performing the sidelink communication; and
transmitting, to the terminal device, information for the terminal device to change from the symbol for performing the communication other than sidelink communication to the symbol for performing the sidelink communication.

14. A terminal device, comprising:
a transceiver; and
a control circuit that:
receives, from a base station based on at least one symbol included in a slot format configured in the terminal device being a symbol for performing communication other than sidelink communication, information for use by the terminal device as a symbol for performing the sidelink communication using the at least one symbol;
reports information to the base station, and
based on the information reported to the base station satisfying a predetermined override condition, receives, from the base station, information for changing the symbol for performing communication other than sidelink communication to the symbol for performing the sidelink communication.

15. A method of communication performed by a terminal device, the method comprising:
- receiving, from a base station based on at least one symbol included in a slot format configured in the terminal device being a symbol for performing communication other than sidelink communication, information for use by the terminal device as a symbol for performing the sidelink communication using the at least one symbol;
- reporting information to the base station; and
- based on the information reported to the base station satisfying a predetermined override condition, receiving, from the base station, information for changing the symbol for performing communication other than sidelink communication to the symbol for performing the sidelink communication.

* * * * *